United States Patent
Yang

(10) Patent No.: US 12,149,322 B2
(45) Date of Patent: Nov. 19, 2024

(54) BEAM INDICATION METHOD, NETWORK-SIDE DEVICE, AND TERMINAL

(71) Applicant: VIVO MOBILE COMMUNICATION CO., LTD., Guangdong (CN)

(72) Inventor: Yu Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 8 days.

(21) Appl. No.: 17/994,074

(22) Filed: Nov. 25, 2022

(65) Prior Publication Data

US 2023/0090518 A1 Mar. 23, 2023

Related U.S. Application Data

(63) Continuation of application No. PCT/CN2021/095888, filed on May 25, 2021.

(30) Foreign Application Priority Data

May 27, 2020 (CN) ......................... 202010463308.5

(51) Int. Cl.
*H04W 72/23* (2023.01)
*H04B 7/08* (2006.01)
*H04L 5/00* (2006.01)

(52) U.S. Cl.
CPC ........... *H04B 7/088* (2013.01); *H04L 5/0048* (2013.01); *H04L 5/0094* (2013.01); *H04W 72/23* (2023.01)

(58) Field of Classification Search
CPC ............... H04W 72/23; H04W 72/046; H04W 72/0446; H04W 16/28; H04W 72/21; H04W 24/10; H04W 72/04; H04W 72/232; H04B 7/0695; H04B 7/088; H04B 7/0617; H04B 7/0408; H04B 17/373; H04B 7/0626; H04B 7/0639; H04B 7/0404;
(Continued)

(56) References Cited

U.S. PATENT DOCUMENTS

2020/0059919 A1* 2/2020 Zhu ..................... H04W 72/51
2021/0227530 A1* 7/2021 Farag .................... H04B 7/088
(Continued)

FOREIGN PATENT DOCUMENTS

CN 111200847 A 5/2020
WO 2018088415 A1 5/2018
(Continued)

OTHER PUBLICATIONS

Ericsson. "High Level Views on Rel-17 FeMIMO" , 3GPP TSG RAN WGJ #101-e e-Meeting RI-2004633, May 16, 2020 (May 16, 2020), 14 pgs.
(Continued)

*Primary Examiner* — Eva Y Puente
(74) *Attorney, Agent, or Firm* — Fredrikson & Byron, P.A.

(57) ABSTRACT

This application discloses a beam indication method, a network-side device, and a terminal. The beam indication method may include: indicating common beam information of a plurality of target objects to a target terminal by using an indication channel, where the common beam information is used to indicate beam information of the plurality of target objects, and the target object includes at least one of the following: a target channel and a target reference signal.

20 Claims, 4 Drawing Sheets

(58) Field of Classification Search
CPC ... H04L 5/0053; H04L 5/0048; H04L 5/0094; H04L 5/0023; H04L 5/00; H04L 5/0035; H04L 1/00; H04L 5/0055; H04L 5/0091
USPC .......................................................... 375/267
See application file for complete search history.

(56) References Cited

U.S. PATENT DOCUMENTS

| | | | | |
|---|---|---|---|---|
| 2021/0282114 | A1* | 9/2021 | Liu | H04B 7/0695 |
| 2021/0376908 | A1* | 12/2021 | Sun | H04W 16/28 |

FOREIGN PATENT DOCUMENTS

| | | |
|---|---|---|
| WO | 2019032696 A1 | 2/2019 |
| WO | 2019201442 A1 | 10/2019 |

OTHER PUBLICATIONS

Samsung. "On Rel. 17 FeMIMO WI", 3GPP TSG RAN WGJ #101-e e-Meeting RI-2003918, May 15, 2020 (May 15, 2020), 12 pgs.

VIVO. "Discussion on Multi-beam Enhancement", 3GPP TSG RAN WGJ #102-e e-Meeting RI-2005363, Aug. 8, 2020 (Aug. 8, 2020), 21 pgs.

International Patent Application No. PCT/CN2021/095888, International Search Report and Written Opinion with Partial English Machine Translation mailed Aug. 16, 2021, 11 pages.

VIVO "Discussion on Multi-Beam Operation", 3GPP TSG RAN WG1 Ad-Hoc Meeting 1901, Jan. 21, 2019, pp. 1-10.

ZTE, Sanechips "On NR Power Control", 3GPP TSG RAN WG1 Meeting NR#3, Sep. 18, 2017, pp. 1-8.

ZTE "Supporting Multi-beam in NR-PDCCH", 3GPP TSG RAN WG1 NR Ad-Hoc#2 meeting, Jun. 27, 2017, pp. 1-7.

European Patent Office, "Extended European Search Report" from Application No. 21812053.3, dated Oct. 26, 2023, pp. 1-15.

ZTE, "Preliminary views on further enhancement for NR MIMO", 3GPP TSG RAN WG1 Meeting #101-e, May 25, 2020, pp. 1-19.

\* cited by examiner

200

Indicate common beam information of a plurality of target objects to a target terminal by using an indication channel — S201

BEAM INDICATION METHOD, NETWORK-SIDE DEVICE, AND TERMINAL

CROSS-REFERENCE TO RELATED APPLICATIONS

This application is a continuation of International Application No. PCT/CN2021/095888, filed on May 25, 2021, which claims priority to Chinese Patent Application No. 202010463308.5, filed in China on May 27, 2020. The entire contents of each of the above-identified applications are expressly incorporated herein by reference.

TECHNICAL FIELD

This application relates to the communications field, and in particular, to a beam indication method, a network-side device, and a terminal.

BACKGROUND

After beam measurement and beam reporting, a network may provide a beam indication for a downlink/uplink channel or a reference signal, where the beam indication is used to establish a beam link between the network and user equipment (UE) to transmit the channel or the reference signal.

In the related art, for a beam indication of a physical downlink control channel (PDCCH), a network side uses radio resource control (RRC) signaling to configure K transmission configuration indication (TCI) states (state) for each control resource set (CORESET). When K>1, a media access control (MAC) control element (CE) indicates or activates one TCI state. When K=1, no additional MAC CE command is required. The UE may learn, based on the TCI state, a receive beam for receiving the PDCCH. For a beam indication of a PDSCH, the network side configures M TCI states by using RRC signaling, then activates 2N TCI states by using a MAC CE command, and then notifies the TCI states by using an N-bit TCI field of downlink control information (DCI). The UE may learn, based on the TCI state, a receive beam for receiving the PDSCH. For a beam indication of a channel state information reference signal (CSI-RS), when the network side configures or activates one CSI-RS resource for the terminal, quasi-co-location (QCL) information of the CSI-RS resource is indicated. The UE may learn, based on the QCL information, a receive beam for receiving the CSI-RS. For a beam indication of a physical uplink control channel (PUCCH), the network side configures spatial relation information for each PUCCH resource by using RRC signaling. If a plurality of pieces of spatial relation information are configured for the PUCCH resource, one piece of the spatial relation information is indicated or activated by using a MAC-CE. The UE may learn, based on the spatial relation information, a transmit beam for the PUCCH. For a beam indication of a physical uplink shared channel (PUSCH), spatial relation information of the PUSCH is as follows: When the PUSCH is scheduled by DCI carried on the PDCCH, the DCI indicates a sounding reference signal resource indicator (SRI), and the SRI is used to indicate the spatial relation information of the PUSCH. The UE may learn, based on the spatial relation information, a transmit beam for the PUSCH. For a beam indication of a sounding reference signal (SRS), when an SRS type is a periodic SRS, the network side configures, activates, or updates one piece of spatial relation information for an SRS resource. The UE may learn, based on the spatial relation information, a transmit beam for the SRS.

However, in a multi-TRP (multiple transmission nodes) scenario, depending on a mode of sending control information, beam indications may be classified into single downlink control information (single DCI) and multiple downlink control information multi-DCI. The single DCI is DCI sent by one TRP (transmission node) to schedule data transmission on a plurality of TRPs. The multi-DCI is DCI sent by a plurality of TRPs to separately schedule data transmission on each TRP.

It can be learned that beam indication mechanisms for various channels and reference signals in the related art are different. Therefore, beam indication signaling overheads are relatively high.

SUMMARY

According to a first aspect of this application, a beam indication method, applied to a network-side device, is provided, which includes:

indicating common beam information of a plurality of target objects to a target terminal by using an indication channel, where the common beam information is used to indicate beam information of the plurality of target objects, and the target object includes at least one of the following: a target channel and a target reference signal.

According to a second aspect of this application, a beam determining method, applied to a terminal, is provided, which includes:

receiving first target indication information transmitted on an indication channel, where the first target indication information is used to indicate common beam information of a plurality of target objects, and the target object includes at least one of the following: a target channel and a target reference signal; and determining beam information of the plurality of target objects based on the common beam information.

According to a third aspect of this application, a beam indication apparatus is provided, which includes an indication module, configured to indicate common beam information of a plurality of target objects to a target terminal by using an indication channel, where the common beam information is used to indicate beam information of the plurality of target objects, and the target object includes at least one of the following: a target channel and a target reference signal.

Optionally, the indication channel is transmitted on a preset control resource set CORESET or transmitted on a control resource set other than the preset control resource set.

Optionally, the indication channel includes a first group common PDCCH; and that the indication module indicates common beam information of a plurality of target objects to a target terminal by using an indication channel includes: indicating common beam information of at least one terminal on the first group common PDCCH, where the at least one terminal includes the target terminal.

Optionally, the apparatus may further include a configuration module, configured to configure information of the first group common PDCCH for the at least one terminal, or indicate information of the first group common PDCCH to the at least one terminal.

Optionally, that the indication module indicates common beam information of at least one terminal on the first group common PDCCH includes: adding common beam information of each of the at least one terminal to the first group common PDCCH based on a preset position or a preset order.

Optionally, the apparatus further includes a first sending module, configured to send first indication information to the at least one terminal, where the first indication information indicates the predetermined position or the preset order of the common beam information of each of the at least one terminal on the first group common PDCCH.

Optionally, after the information of the first group common PDCCH is configured for the at least one terminal, or the information of the first group common PDCCH is indicated to the at least one terminal, the indication module is further configured to: if a status of a first terminal in the at least one terminal changes, indicate common beam information of the first terminal by using a second group common PDCCH, where the second group common PDCCH is a group common PDCCH other than the first group common PDCCH.

Optionally, after the information of the first group common PDCCH is configured for the at least one terminal, or the information of the first group common PDCCH is indicated to the at least one terminal, the indication module is further configured to: if a status of a first terminal in the at least one terminal changes, send the first group common PDCCH by using first beam information, and indicate common beam information of the first terminal, where the first beam information is different from second beam information, and the second beam information is beam information of the first group common PDCCH transmitted before the status of the first terminal changes.

Optionally, the second group common PDCCH or the first beam information is determined by using any one of the following:
  an uplink feedback resource currently used by the first terminal;
  an uplink feedback resource used by the first terminal to send feedback information of the indication channel;
  a beam report sent by the first terminal;
  beam information used by the first terminal to send an uplink channel; and
  a physical random access channel PRACH sent by the first terminal.

Optionally, the apparatus further includes a second sending module, configured to send second indication information to the at least one terminal if the status of the first terminal in the at least one terminal changes, where the second indication information is used to update a preset position or a preset order of common beam information of each of the at least one terminal on the first group common PDCCH or the second group common PDCCH.

Optionally, the indication channel includes a dedicated PDCCH; and that the indication module indicates common beam information of a plurality of target objects to a target terminal by using an indication channel includes: adding the common beam information to a common beam information signaling field in DCI on the dedicated PDCCH.

Optionally, the apparatus may further include a receiving module, configured to receive first feedback information from the target terminal for the common beam information.

Optionally, the apparatus may further include a transmission module, configured to: if the first feedback information is acknowledgement information, transmit the target object to the target terminal by using the common beam information; or if the first feedback information is negative acknowledgement information, transmit the target object to the target terminal based on beam information currently used by the target object.

Optionally, the transmission module may be further configured to: if the first feedback information for the common beam information is not received from the target terminal within a preset time, transmit the target object to the target terminal based on beam information currently used by the target object, or transmit the target object to the target terminal by using the common beam information and beam information currently used by the target object.

Optionally, the apparatus further includes an allocation module, configured to allocate a resource to the target terminal for sending the first feedback information, and receive the first feedback information on the resource.

Optionally, the transmission module is further configured to transmit the target object to the target terminal by using the common beam information and beam information currently used by the target object.

Optionally, the apparatus further includes a determining module, configured to determine third beam information as beam information of each CORESET in a first CORESET group, and determine fourth beam information as beam information of each CORESET in a second CORESET group.

Optionally, if the indication channel is transmitted on the first CORESET group and/or the second CORESET group, one of the third beam information and the fourth beam information is beam information currently used by the indication channel, and the other is beam information of the indication channel that is indicated by the indication channel or a preset command; or if the target object is transmitted on the first CORESET group and/or the second CORESET group, one of the third beam information and the fourth beam information is beam information currently used by the target object, and the other is the common beam information indicated by the indication channel, where the target object is a control channel.

Optionally, the first CORESET group includes a CORESET with a smallest CORESET identifier, and the second CORESET group includes a CORESET other than the CORESET with the smallest CORESET identifier.

Optionally, the apparatus further includes a third sending module, configured to send third indication information to the target terminal, where the third indication information is used to indicate the third beam information and/or the fourth beam information.

Optionally, that the third sending module sends third indication information to the target terminal includes either of the following: sending the third indication information by using the indication channel; and sending the third indication information by using a media access control MAC control element CE command.

Optionally, that the third indication information is used to indicate the third beam information and/or the fourth beam information includes either of the following: the third indication information includes a group identifier of the first CORESET group and the third beam information, and/or a group identifier of the second CORESET group and the fourth beam information; and the third beam information and/or the fourth beam information in the third indication information are/is arranged in a preset position or a preset order.

Optionally, the plurality of target objects include the indication channel.

Optionally, the plurality of target objects include channels and reference signals other than the indication channel.

Optionally, the indication channel is further used to indicate the beam information of the indication channel.

Optionally, the indication channel includes a first signaling field and a second signaling field, where the first signaling field is used to indicate the common beam information of the plurality of target objects, and the second signaling field is used to indicate the beam information of the indication channel.

Optionally, the indication channel indicates the common beam information and indicates the beam information of the indication channel in the following manner:

indicating the beam information of the indication channel by using a preset first indication channel format, and indicating the common beam information of the plurality of target objects by using a preset second indication channel format; or indicating the beam information of the indication channel by using a preset first resource, and indicating the common beam information of the plurality of target objects by using a preset second resource.

Optionally, the indication channel indicates the common beam information and indicates the beam information of the indication channel in the following manner: indicating the common beam information and the beam information of the indication channel by using the indication channel in a predetermined format and/or transmitting the indication channel on a predetermined resource, where the common beam information is the same as the beam information of the indication channel.

Optionally, the beam information of the indication channel is TCI state information of the CORESET on which the indication channel is located.

Optionally, if the indication channel is the first group common PDCCH, in the beam information indicated by the first group common PDCCH, the beam information of the indication channel is different from the common beam information of the plurality of target objects.

Optionally, the apparatus further includes a receiving module, configured to: receive second feedback information from the target terminal for the beam information of the indication channel; and if the second feedback information is acknowledgement information, transmit the indication channel to the target terminal by using the indicated beam information of the indication channel; or if the second feedback information is negative acknowledgement information, transmit the indication channel to the target terminal by using current beam information of the indication channel.

Optionally, the receiving module is further configured to: if the second feedback information is not received within a preset time, transmit the indication channel to the target terminal by using the current beam information of the indication channel, or transmit the transmission channel to the target terminal by using the current beam information of the indication channel and the indicated beam information of the indication channel.

Optionally, the transmission module is further configured to perform at least one of the following after the common beam information and the beam information of the indication channel are indicated by using the indication channel:

transmitting the target object to the target terminal by using the common beam information and the beam information currently used by the target object; and transmitting the indication channel to the target terminal by using the indicated beam information of the indication channel and the beam information currently used by the indication channel.

Optionally, the indication module may be further configured to indicate the beam information of the indication channel by using a preset command.

Optionally, the transmission module is further configured to transmit the indication channel to the target terminal by using the indicated beam information of the indication channel and the beam information currently used by the indication channel.

Optionally, the receiving module may be further configured to: receive third feedback information from the target terminal for the preset command; and if the third feedback information is acknowledgement information, send the indication channel by using the beam information of the indication channel that is indicated by the preset command; or if the third feedback information is negative acknowledgement information, send the indication channel by using current beam information of the indication channel.

Optionally, the receiving module is further configured to: if the third feedback information is not received within a preset time, transmit the indication channel to the target terminal by using the current beam information of the indication channel, or transmit the transmission channel to the target terminal by using the current beam information of the indication channel and the beam information of the indication channel that is indicated by the preset command.

According to a fourth aspect, an embodiment of this application provides a beam determining apparatus, including: a receiving module, configured to receive first target indication information transmitted on an indication channel, where the first target indication information is used to indicate common beam information of a plurality of target objects, and the target object includes at least one of the following: a target channel and a target reference signal; and a determining module, configured to determine beam information of the plurality of target objects based on the common beam information.

Optionally, the indication channel is a prescribed channel or a channel configured by a network.

Optionally, the receiving module may be configured to:

receive downlink control information DCI in a predetermined format, sent on the indication channel, where the DCI in the predetermined format includes a signaling field for indicating the common beam information; and obtain the first target indication information from the signaling field.

Optionally, the DCI in the predetermined format includes any one of the following:

DCI carried on a physical downlink control channel PDCCH;

DCI for scheduling data channel transmission; and

DCI dedicated to indicating the common beam information.

Optionally, the common beam information includes any one of the following: common transmission configuration indication TCI state information, common quasi-co-location QCL information, and common spatial relation information.

Optionally, the receiving module may be further configured to:

receive, on a preset control resource set CORESET, the first target indication information transmitted on the indication channel, or receive, on a control resource set other than the preset control resource set, the first target indication information transmitted on the indication channel.

Optionally, the indication channel includes a first group common PDCCH; and the receiving module may be further configured to:

receive configuration information of the first group common PDCCH, or receive indication information of the first group common PDCCH.

Optionally, the receiving first target indication information transmitted on an indication channel includes: monitoring the first group common PDCCH, and obtaining the first target indication information transmitted on the first group common PDCCH, where the first group common PDCCH is used to indicate first target indication information of at least one terminal, and the at least one terminal includes the terminal.

Optionally, the receiving module may be further configured to: monitor the first group common PDCCH, where the first target indication information of the at least one terminal is transmitted on the first group common PDCCH, and the at least one terminal includes the terminal; and obtain the first target indication information of the terminal based on a preset position or a preset order of first target indication information of each of the at least one terminal on the first group common PDCCH.

Optionally, the receiving module may be further configured to: if a status of the terminal changes, monitor a second group common PDCCH, and obtain the first target indication information transmitted on the second group common PDCCH, where the second group common PDCCH is a group common PDCCH other than the first group common PDCCH.

Optionally, the monitoring the first group common PDCCH includes: if a status of the terminal changes, monitoring the first group common PDCCH based on first beam information, and obtaining the first target indication information transmitted on the first group common PDCCH, where the first beam information is different from second beam information, and the second beam information is beam information of the first group common PDCCH monitored before the status of the terminal changes.

Optionally, the receiving module may be further configured to receive first indication information, where the first indication information is used to indicate the preset position or the preset order of the first target indication information of the at least one terminal on the first group common PDCCH, and the at least one terminal includes the terminal.

Optionally, the receiving module may be further configured to receive second indication information, where the second indication information is used to update the preset position or the preset order of the first target indication information of each of the at least one terminal on the first group common PDCCH or the second group common PDCCH.

Optionally, the second group common PDCCH or the first beam information is determined by using any one of the following:
  an uplink feedback resource currently used by the terminal;
  an uplink feedback resource used by the terminal to send feedback information of the indication channel;
  a beam report sent by the terminal;
  beam information used by the terminal to send an uplink channel; and
  a physical random access channel PRACH sent by the terminal.

Optionally, the indication channel is a PDCCH dedicated to the terminal.

Optionally, the apparatus may further include a first sending module, configured to send, on a first uplink feedback resource, first feedback information for the first target indication information, where if the first target indication information is successfully received, the first feedback information is acknowledgement information, or if the first target indication information is not successfully received, the first feedback information is negative acknowledgement information.

Optionally, the apparatus may further include a first transmission module, configured to: if the first target indication information is successfully received, transmit the target object by using the common beam information indicated by the first target indication information, or transmit the target object by using the common beam information and beam information currently used by the target object; or if the first target indication information is not successfully received, transmit the target object based on beam information currently used by the target object.

Optionally, the receiving module may be further configured to receive third indication information, where the third indication information is used to indicate third beam information and/or fourth beam information, the third beam information is beam information of each CORESET in a first CORESET group, and the fourth beam information is beam information of each CORESET in a second CORESET group.

Optionally, the receiving module is further configured to receive, based on beam information corresponding to a CORESET on which the indication channel is located, the first target indication information transmitted on the indication channel; or the receiving module is further configured to transmit the target object based on beam information corresponding to a CORESET on which the target object is located, where the target object is a control channel.

Optionally, the first CORESET group includes a CORESET with a smallest CORESET identifier, and the second CORESET group includes a CORESET other than the CORESET with the smallest CORESET identifier.

Optionally, the receiving third indication information includes either of the following:
  receiving the third indication information from the indication channel; and
  receiving the third indication information sent by using a MAC CE command.

Optionally, that the third indication information is used to indicate the third beam information and/or the fourth beam information includes either of the following:
  the third indication information includes a group identifier of the first CORESET group and the third beam information, and/or a group identifier of the second CORESET group and the fourth beam information; and
  the third beam information and/or the fourth beam information in the third indication information are/is arranged in a preset position or a preset order.

Optionally, the plurality of target objects include the indication channel.

Optionally, the plurality of target objects include channels and reference signals other than the indication channel.

Optionally, the receiving module may be further configured to receive second target indication information transmitted on the indication channel, where the second target indication information is used to indicate beam information of the indication channel.

Optionally, the receiving first target indication information and second target indication information transmitted on the indication channel includes: obtaining the first target indication information from a first signaling field of the indication channel, and obtaining the second target indication information from a second signaling field of the indication channel.

Optionally, the receiving module may be further configured to: receive, on the indication channel, the first target indication information transmitted by using a first indication channel format, and receive, on the indication channel, the second target indication information transmitted by using a second indication channel format; or receive the first target indication information on a preset first resource, and receive the second target indication information on a preset second resource.

Optionally, the receiving module may be further configured to receive the indication channel transmitted in a predetermined format and/or the indication channel transmitted on a predetermined resource, and obtain the first target indication information and the second target indication information, where the first target indication information is the same as the second target indication information.

Optionally, the apparatus may further include a second sending module, configured to send, on a second uplink feedback resource, second feedback information for the second target indication information, where if the second target indication information is successfully received, the second feedback information is acknowledgement information, or if the second target indication information is not successfully received, the second feedback information is negative acknowledgement information.

Optionally, the apparatus may further include a second transmission module, configured to: if the second target indication information is successfully received, receive the indication channel by using the beam information indicated by the second target indication information, or receive the indication channel by using the beam information indicated by the second target indication information and beam information currently used by the indication channel; or if the second target indication information is not successfully received, receive the indication channel based on beam information currently used by the indication channel.

Optionally, the receiving module may be further configured to receive beam information of the indication channel that is indicated by a preset command.

Optionally, the apparatus may further include a third sending module, configured to send, on a third uplink feedback resource, third feedback information for the preset command, where if the preset command is successfully received, the third feedback information is acknowledgement information, or if the preset command is not successfully received, the third feedback information is negative acknowledgement information.

Optionally, the receiving module may be further configured to: if the preset command is successfully received, receive the indication channel by using the beam information indicated by the preset command, or receive the indication channel by using the beam information indicated by the preset command and beam information currently used by the indication channel; or if the preset command is not successfully received, receive the indication channel based on beam information currently used by the indication channel.

Optionally, the receiving module may further perform at least one of the following:

receiving an uplink feedback resource configured or indicated by a network side, where the uplink feedback resource includes the first uplink feedback resource, the second uplink feedback resource, or the third uplink feedback resource; and determining the first uplink feedback resource, the second uplink feedback resource, or the third uplink feedback resource based on preset resource information.

Optionally, the preset resource information includes any one of the following: a downlink resource used by the indication channel, an uplink feedback resource configured by a network, and a prescribed uplink feedback resource.

Optionally, the apparatus may further include a determining module, configured to perform at least one of the following:

determining the first uplink feedback resource, the second uplink feedback resource, or the third uplink feedback resource based on the preset resource information in combination with identification information of the terminal;

determining the first uplink feedback resource, the second uplink feedback resource, or the third uplink feedback resource based on the preset resource information in combination with a radio network temporary identifier RNTI of the terminal;

determining the first uplink feedback resource, the second uplink feedback resource, or the third uplink feedback resource based on the preset resource information and by using preset code information corresponding to the terminal;

determining the first uplink feedback resource, the second uplink feedback resource, or the third uplink feedback resource based on the preset resource information and by using a preset time domain parameter corresponding to the terminal; and determining the first uplink feedback resource, the second uplink feedback resource, or the third uplink feedback resource based on the preset resource information and by using a preset frequency domain parameter corresponding to the terminal.

Optionally, the RNTI is a cell radio network temporary identifier (C-RNTI).

Optionally, the preset resource information is a periodic resource or an aperiodic resource.

Optionally, the apparatus further includes a determining module, configured to: if it is determined, based on the indication of the indication channel or based on a preset command, that beam switching occurs on a predetermined CORESET, determine a monitoring occasion of the predetermined CORESET based on either of the following: determining based on beam information of the predetermined CORESET after switching or based on a synchronization signal block SSB corresponding to the predetermined CORESET; and determining based on predetermined configuration information from the network side, where the predetermined configuration information is sent by the network side by using the beam information of the predetermined CORESET after switching or beam information of the SSB corresponding to the predetermined CORESET, where the predetermined CORESET is a CORESET with a smallest CORESET identifier.

According to a fifth aspect of this application, a network-side device is provided, which includes a memory, a processor, and a program or instructions stored in the memory and capable of running on the processor, where when the program or instructions are executed by the processor, the steps of the method according to the first aspect are implemented.

According to a sixth aspect of this application, a terminal is provided, which includes a memory, a processor, and a program or instructions stored in the memory and capable of running on the processor, where when the program or instructions are executed by the processor, the steps of the method according to the second aspect are implemented.

According to a seventh aspect of this application, a readable storage medium is provided, where the readable storage medium stores a program or instructions, and when the program or instructions are executed by a processor, the steps of the method according to the first aspect are implemented, or the steps of the method according to the second aspect are implemented.

According to an eighth aspect of this application, a chip is provided, where the chip includes a processor and a communications interface, the communications interface is coupled to the processor, and the processor is configured to run a program or instructions on a network-side device to implement the method according to the first aspect, or configured to run a program or instructions on a terminal to implement the method according to the second aspect.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or order. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long time evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, a new radio (NR) system is described for an illustration purpose, and NR terms are used in most of the following descriptions, although these technologies may also be applied to other systems than the NR system, for example, a 6th Generation (6G) communications system.

Figures 1, 2:
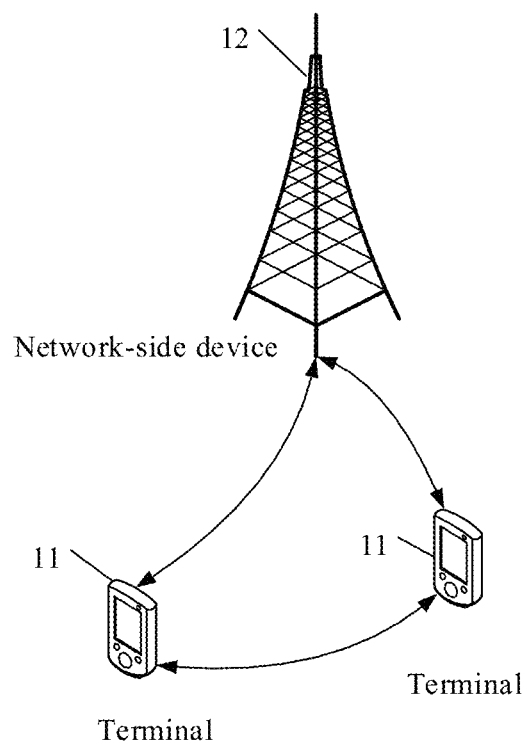
FIG. 1 is a block diagram of a wireless communications system according to an embodiment of this application.
FIG. 2 is a schematic flowchart of a beam indication method according to an embodiment of this application.

FIG. 1 is a block diagram of a wireless communications system to which an embodiment of this application may be applied. The wireless communications system includes a terminal 11 and a network-side device 12. The terminal 11 may also be referred to as a terminal device or a user terminal (UE). The terminal 11 may be a terminal-side device such as a mobile phone, a tablet computer (Tablet Personal Computer), a laptop computer (Laptop Computer) or a notebook computer, a personal digital assistant (PDA), a palmtop computer, a netbook, an ultra-mobile personal computer (UMPC), a mobile Internet device (MID), a wearable device (Wearable Device), a vehicular device (VUE), or a pedestrian terminal (PUE). The wearable device includes a smart band, an earphone, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

A beam indication method, a network-side device, and a terminal provided in the embodiments of this application are hereinafter described in detail by using specific embodiments and application scenarios thereof with reference to the accompanying drawings.

FIG. 2 is a schematic flowchart of a beam indication method according to an embodiment of this application. The method may be performed by a network-side device. In other words, the method 200 may be performed by software or hardware installed on the network-side device. As shown in FIG. 2, the method may include the following step.

S201. Indicate common beam information of a plurality of target objects to a target terminal by using an indication channel, where the common beam information is used to indicate beam information of the plurality of target objects, and the target object includes at least one of the following: a target channel and a target reference signal.

In this embodiment of this application, the target channel includes but is not limited to a PDCCH, a PDSCH, a PUSCH, a PUCCH, or the like; and the target reference signal includes but is not limited to a synchronization signal block (Synchronization Signal Block, SSB), a CSI-RS, an SRS, or the like.

For a high-frequency communications system, a communications link between a network and a terminal can usually use a single-beam mode, that is, beam directions of a control channel, a data channel, a reference signal, and the like are basically consistent. Therefore, in this embodiment of this application, the network-side device can indicate or update beam information of a plurality of subsequent target objects to the target terminal by using the indication channel, so that unified common beam information can be indicated for the plurality of target objects. Therefore, signaling overheads of the beam indication are reduced, the beam information of the target objects can be switched quickly, and flexibility of the beam information indication is improved.

It should be noted that, in a possible implementation of this application, the indication channel may be a prescribed channel or a channel configured by the network.

In a possible implementation, on the indication channel, DCI in a predetermined format may be used to indicate the common beam information. Therefore, the foregoing S201 may include: sending, by using the indication channel, DCI in a predetermined format to indicate the common beam information of the plurality of target objects, where the DCI in the predetermined format includes a signaling field for indicating the common beam information.

The DCI in the predetermined format may include any one of the following:

(1) DCI carried on a physical downlink control channel (PDCCH), where for example, beam indication information in any DCI format during scheduling of channel or reference signal transmission can be used to indicate the common beam information, for example, a DCI format 1_1 or a DCI format 0_1;

(2) DCI for scheduling data channel transmission, that is, the DCI may be in a specific DCI format carried on the PDCCH, where for example, beam indication information in the DCI format 1_1 for scheduling a physical downlink shared channel (Physical Downlink Shared Channel, PDSCH) can be used to indicate the common beam information; and (3) DCI dedicated to indicating the common beam information, that is, a DCI format dedicated to transmitting the common beam information, where the DCI includes a signaling field for indicating the common beam information.

In a possible implementation, the common beam information may include but is not limited to any one of the following: common transmission configuration indication (TCI) state information, common quasi-co-location (QCL) information, and common spatial relation information. In other words, the beam information of the plurality of target objects is common TCI state information, common QCL information, or common spatial relation information.

Optionally, the indication channel may be transmitted on a preset control resource set (CORESET) or transmitted on a control resource set other than the preset control resource set. For example, the indication channel may be transmitted on a CORESET with a smallest CORESET identifier, or transmitted on a CORESET other than the CORESET with the smallest CORESET identifier. Alternatively, the indication channel may be transmitted on only a CORESET #0 (that is, a CORESET with a smallest CORESET identifier), or transmitted on a CORESET other than the CORESET #0.

In a possible implementation, the indication channel may be a group common PDCCH or may be a dedicated PDCCH.

In other words, the indication channel may be a group common PDCCH for a group of terminals or a PDCCH dedicated to one terminal.

Therefore, in a possible implementation, the indication channel may include a first group common PDCCH; and S201 may include: indicating common beam information of at least one terminal on the first group common PDCCH, where the at least one terminal includes the target terminal. In this possible implementation, the network-side device may add common beam information of each of the at least one terminal to the first group common PDCCH based on a preset position or a preset order. In other words, the network-side device indicates the common beam information of the at least one terminal on the first group common PDCCH, where the common beam information of each of the at least one terminal is arranged in the preset position or the preset order on the first group common PDCCH.

In a possible implementation, to enable each of the at least one terminal to learn information of the first group common PDCCH, before S201, the beam indication method may further include: configuring information of the first group common PDCCH for the at least one terminal, or indicating information of the first group common PDCCH to the at least one terminal. Each of the at least one terminal may determine the first group common PDCCH based on the configured or indicated information of the first group common PDCCH, and the at least one terminal monitors the group PDCCH.

In another possible implementation, to enable each of the at least one terminal to learn a position or order of the common beam information of the terminal on the first group common PDCCH, before the indicating common beam information of at least one terminal on the first group common PDCCH, the beam indication method may further include: sending first indication information to the at least one terminal, where the first indication information indicates the preset position or the preset order of the common beam information of each of the at least one terminal on the first group common PDCCH. By using the first indication information, each of the at least one terminal can learn the position or order of the common beam information of the terminal on the first group common PDCCH.

In the foregoing possible implementation, after the first group common PDCCH is configured for the at least one terminal, a status of a terminal may change. For example, a terminal moves (for example, reaches a distance) or rotates (for example, reaches an angle), another group common PDCCH may be used instead to transmit the common beam information of the terminal. Therefore, the beam indication method may further include: if a status of a first terminal in the at least one terminal changes, indicating common beam information of the first terminal by using a second group common PDCCH, where the second group common PDCCH is a group common PDCCH other than the first group common PDCCH.

In the foregoing possible implementation, the network-side device may further reconfigure or indicate information of the second group common PDCCH for the first terminal, so that the first terminal can learn and monitor the second group common PDCCH. The second group common PDCCH may be shared by the first terminal and other terminals (which may not include a terminal whose status does not change in the at least one terminal), that is, the first terminal and the other terminals are a group of terminals.

It may be understood that the second group common PDCCH may be configured by the network-side device before the first terminal changes, or may be configured after a change of the first terminal is detected. This is not specifically limited in this embodiment of this application.

In a possible implementation, the configured or indicated information of the group common PDCCH may include TCI state information of the group common PDCCH. In this case, the first terminal may use the TCI state information in the reconfigured or indicated information of the group common PDCCH (that is, the second group common PDCCH) to monitor the group common PDCCH (that is, the second group common PDCCH); and the terminal whose status does not change in the at least one terminal monitors an original group common PDCCH (that is, the first group common PDCCH). The network-side device separately sends the first group common PDCCH and the second group common PDCCH.

In another possible implementation, after the configuring information of the first group common PDCCH for the at least one terminal, or indicating information of the first group common PDCCH to the at least one terminal, if a status of a first terminal in the at least one terminal changes, the beam indication method may further include: sending the first group common PDCCH by using first beam information, and indicating common beam information of the first terminal, where the first beam information is different from second beam information, and the second beam information is beam information of the first group common PDCCH transmitted before the status of the first terminal changes. In other words, in this possible implementation, the network side reconfigures or indicates the beam information of the first group common PDCCH (that is, the first beam information). The network side sends the first group common PDCCH by using the first beam information, indicates, by using the first group common PDCCH that is sent by using the first beam information, the common beam information of the first terminal whose status changes, and indicates, by using the first group common PDCCH that is sent by using the original beam information (that is, the second beam information), common beam information of another terminal whose status does not change.

It may be understood that the first beam information may be configured or indicated by the network-side device before the first terminal changes, or may be configured or indicated after a change of the first terminal is detected. This is not specifically limited in this embodiment of this application.

Optionally, the second group common PDCCH or the first beam information may be determined by using any one of the following: an uplink feedback resource currently used by the first terminal; an uplink feedback resource used by the first terminal to send feedback information of the indication channel; a beam report sent by the first terminal; beam information used by the first terminal to send an uplink channel; and a physical random access channel (PRACH) resource sent by the first terminal.

Optionally, a correspondence between an uplink feedback resource used by UE and a group common PDCCH or beam information of a group common PDCCH may be preset. In this case, the second group common PDCCH or the first beam information may be determined based on the uplink feedback resource currently used by the first terminal or the uplink feedback resource used by the first terminal for feeding back the feedback information of the indication channel.

In the foregoing possible implementation, because the status of the first terminal changes, the position or order of the common beam information carried on the first group common PDCCH may change. Therefore, the beam indication method may further include: sending second indication information to the at least one terminal, where the second indication information is used to update a preset position or a preset order of common beam information of each of the at least one terminal on the first group common PDCCH or the second group common PDCCH. In other words, when a status of a terminal in the at least one terminal changes, the network-side device may indicate or update the position or the carrying order of the common beam information of each terminal on the first group common PDCCH or the second group common PDCCH by using the second indication information.

In another possible implementation, the indication channel may alternatively use a dedicated PDCCH, that is, a PDCCH dedicated to each terminal. Therefore, in the foregoing S201, the following content may be performed: adding the common beam information to a common beam information signaling field in DCI on the dedicated PDCCH.

In a possible implementation, to enable the network-side device to learn whether the target terminal successfully receives the common beam information, the target terminal may send feedback information to the network-side device. Therefore, in this possible embodiment, after S201, the beam indication method may further include: receiving first feedback information from the target terminal for the common beam information.

In the foregoing possible implementation, optionally, after the receiving first feedback information from the target terminal for the common beam information, the method may further include: if the first feedback information is acknowledgement information, transmitting the target object to the target terminal by using the common beam information; or if the first feedback information is negative acknowledgement information, transmitting the target object to the target terminal based on beam information currently used by the target object.

Optionally, in another possible embodiment of this application, after S201, the beam indication method may further include: if the first feedback information for the common beam information is not received from the target terminal within a preset time, transmitting the target object to the target terminal based on beam information currently used by the target object, or by using the indicated common beam information and beam information currently used by the target object. In other words, after the network-side device indicates the common beam information to the target terminal, the network-side device may not receive the first feedback information (possibly the target terminal has not received the common beam information and therefore does not send the first feedback information, or possibly the first feedback information (for example, an ACK or a NACK) is lost during transmission). In this case, the network-side device may still transmit the target object subsequently by using the beam information (that is, the original beam information) currently used by the target object, or transmit the target object by using the indicated common beam information and the beam information currently used by the target object, to ensure that the target object can be correctly transmitted to the target terminal.

In the foregoing possible implementation, a resource for sending the first feedback information by the target terminal may be prescribed, or may be an uplink feedback resource allocated or indicated by the network-side device. Therefore, in a possible implementation, the beam indication method may further include: allocating a resource to the target terminal for sending the first feedback information, and receiving the first feedback information based on the resource. For example, the network-side device may allocate an uplink feedback resource to the target terminal in advance, and monitor the first feedback information fed back by the target terminal on the uplink feedback resource.

In another possible implementation, no feedback mechanism may be used, and after S201, the beam indication method may further include: transmitting the target object to the target terminal by using the common beam information and beam information currently used by the target object. In other words, in this possible implementation, after the terminal receives the common beam information, the terminal does not feed back whether the common beam information is successfully received. In this case, in a subsequent transmission process, the network-side device transmits the target object to the target terminal by using both the common beam information and the beam information currently used by the target object. In this possible implementation, occupation of uplink resources can be reduced.

In another possible implementation, alternatively, CORESETs may be grouped in a case that no feedback mechanism is used. In this possible implementation, the beam indication method may further include: determining third beam information as beam information of each CORESET in a first CORESET group, and determining fourth beam information as beam information of each CORESET in a second CORESET group.

In the foregoing possible implementation, optionally, a CORESET with a smallest CORESET identifier and other CORESETs may be classified into two groups, that is, the first CORESET group includes the CORESET with the smallest CORESET identifier (for example, the CORESET #0), and the second CORESET group includes CORESETs other than the CORESET with the smallest CORESET identifier (for example, CORESETs other than the CORESET #0).

In the foregoing possible implementation, optionally, before the determining third beam information as beam information of each CORESET in a first CORESET group, and determining fourth beam information as beam information of each CORESET in a second CORESET group, the beam indication method may further include: sending third indication information to the target terminal, where the third indication information is used to indicate the third beam information and/or the fourth beam information. In other words, in this possible implementation, the third indication information may be used to indicate beam information of one of the CORESET groups, or may indicate beam information of both the two CORESET groups. In an actual application, the third indication information may be sent by using the indication channel, or the third indication information may be sent by using a media access control (MAC) control element (CE) command.

The third indication information may include a group identifier of the first CORESET group and the third beam information, and/or a group identifier of the second CORESET group and the fourth beam information. In other words, a CORESET group corresponding to each piece of beam information may be explicitly indicated in the third indication information; or the third beam information and/or the fourth beam information in the third indication information are/is arranged in a preset position or a preset order, that is, the CORESET group corresponding to each piece of beam information is not explicitly indicated in the third indication information, but the third beam information and/or the fourth beam information are/is arranged in the preset position or the preset order.

In the foregoing possible implementation, the indication channel may be transmitted in one or more CORESET groups in different CORESET groups. In other words, if the indication channel is transmitted on the first CORESET group and/or the second CORESET group, one of the third beam information and the fourth beam information is beam information currently used by the indication channel, and the other is beam information of the indication channel that is indicated by the indication channel or the MAC CE command. Therefore, transmission reliability and robustness of the indication channel are enhanced.

In the foregoing possible implementation, when a target object is a control channel (for example, a PDCCH), DCI carried on the target object can be transmitted in one or more CORESET groups in different CORESET groups, that is, the target object is transmitted on the first CORESET group and/or the second CORESET group. In this case, one of the third beam information and the fourth beam information is beam information currently used by the target object, and the other is common beam information indicated by the indication channel. Therefore, transmission reliability and robustness of control signaling are enhanced.

In the foregoing possible implementation, the network may indicate beam information of only one CORESET group, and beam information of the other CORESET group is still the beam information currently used (that is, the original beam information).

In each of the foregoing possible implementations, the plurality of target objects may include the indication channel, that is, the common beam information indicated by the indication channel is also the beam information of the indication channel.

Alternatively, in each of the foregoing possible implementations, the plurality of target objects may not include the indication channel, that is, the plurality of target objects include channels and reference signals other than the indication channel.

When the plurality of target objects include channels and reference signals other than the indication channel, in a possible implementation, the indication channel is also used to indicate the beam information of the indication channel. In other words, the indication channel can indicate not only the common beam information, but also its own beam information. In this possible implementation, the indication channel may be transmitted on a specific CORESET, such as the CORESET #0 or other CORESETs than the CORESET #0.

In the foregoing possible implementation, the indication channel may include a first signaling field and a second signaling field, where the first signaling field is used to indicate the common beam information of the plurality of target objects, and the second signaling field is used to indicate the beam information of the indication channel. For example, the indication channel may include a common beam information signaling field and an indication channel beam information signaling field, where the common beam information signaling field is used to indicate beam information of the other channels and reference signals, and the indication channel beam information signaling field is used to indicate the beam information of the indication channel.

Alternatively, a channel or reference signal to which the indicated beam information belongs may be indicated by an indication channel format or resource, that is, different formats or different resources are used to indicate the beam information of the indication channel and the beam information of the plurality of target objects respectively. For example, in a possible implementation, the indication channel may indicate the common beam information and indicate the beam information of the indication channel in the following manner: indicating the beam information of the indication channel by using a preset first indication channel format, and indicating the common beam information of the plurality of target objects by using a preset second indication channel format; or indicating the beam information of the indication channel by using a preset first resource, and indicating the common beam information of the plurality of target objects by using a preset second resource. The indication channel may be in a DCI format.

Alternatively, the beam information of the indication channel and the beam information of the other channels and reference signals may be indicated by using a same format or a same resource, that is, the beam information of the indication channel is the same as the beam information of the other channels and reference signals. Therefore, in another possible implementation, the indication channel may further indicate the common beam information and indicate the beam information of the indication channel in the following manner: indicating the common beam information and the beam information of the indication channel by using the indication channel in a predetermined format and/or transmitting the indication channel on a predetermined resource, where the common beam information is the same as the beam information of the indication channel.

In the foregoing possible implementation, the beam information of the indication channel may be TCI state information of the CORESET on which the indication channel is located.

In the foregoing possible implementation, if the indication channel is the first group common PDCCH, in the beam information indicated by the first group common PDCCH, the beam information of the indication channel is different from the common beam information of the plurality of target objects. In other words, if the indication channel is the first group common PDCCH, the beam information indicated by the first group common PDCCH includes the beam information of the indication channel and the common beam information of each of the at least one terminal.

That the beam information of the indication channel is different from the common beam information of the plurality of target objects may be that the beam information of the indication channel is different from common beam information of all of the at least one terminal, or different from common beam information of a part of the at least one terminal.

In a possible implementation, after the indicating the beam information of the indication channel by using the indication channel, the beam indication method may further include: receiving second feedback information from the target terminal for the beam information of the indication channel; and if the second feedback information is acknowledgement information, transmitting the indication channel to the target terminal based on the indicated beam information of the indication channel; or if the second feedback information is negative acknowledgement information, transmitting the indication channel to the target terminal based on current beam information of the indication channel.

In an actual application, the second feedback information may not be received. For example, the target terminal has not received the beam information of the indication information, and therefore does not feed back the second feedback information, or the target terminal has fed back the second feedback information (possibly an ACK or a NACK), but the second feedback information is lost during transmission, and therefore is not received. Therefore, in a possible implementation, the method may further include: if the second feedback information is not received within a preset time, transmitting the indication channel to the target terminal by using the current beam information of the indication channel, or transmitting the indication channel to the target terminal by using the indicated beam information of the indication channel and the current beam information of the indication channel.

In this embodiment of this application, the target terminal may send feedback information, that is, the first feedback information and the second feedback information, respectively for the indicated beam information of the indication channel and the common beam information; or the target terminal may send only one piece of feedback information for the indicated beam information of the indication channel and the common beam information, that is, the first feedback information and the second feedback information are the same feedback information, where the feedback information indicates whether the target terminal successfully receives the beam information of the indication channel and the common beam information. If the target terminal successfully receives the beam information of the indication channel and the common beam information, the target terminal feeds back acknowledgement information; or if the target terminal fails to receive either of the beam information of the indication channel and the common beam information, the target terminal feeds back negative acknowledgement information. After the network-side device receives the feedback information sent by the target terminal, if the feedback information is acknowledgement information, the network-side device transmits the indication channel by using the indicated beam information of the indication channel, and transmits the plurality of target objects by using the common beam information; or if the feedback information is negative acknowledgement information, the network-side device transmits the target object to the target terminal by using the beam information currently used by the target object, and transmits the indication channel to the target terminal by using the beam information currently used by the indication channel. If the feedback information is not received within a preset time, the target object is transmitted to the target terminal by using the beam information currently used by the target object, or the common beam information and the beam information currently used by the target object; and the indication channel is transmitted to the target terminal by using the indicated beam information of the indication channel and the beam information currently used by the indication channel.

In a possible implementation, to ensure transmission reliability and robustness, after the indicating the common beam information and the beam information of the indication channel by using the indication channel, the beam indication method may further include at least one of the following: transmitting the target object to the target terminal by using the common beam information and the beam information currently used by the target object; and transmitting the indication channel to the target terminal by using the indicated beam information of the indication channel and the beam information currently used by the indication channel.

In a possible implementation, to enable the target terminal to receive the indication channel, before S201, the beam indication method may further include: indicating the beam information of the indication channel by using a preset command.

The preset command may be a MAC CE command.

The beam information indicated by the preset command may be beam information of the CORESET on which the indication channel is located.

In the foregoing possible implementation, after S201, the beam indication method may further include: transmitting the indication channel to the target terminal by using the beam information of the indication channel that is indicated by the preset command and the beam information currently used by the indication channel.

Alternatively, in another possible implementation, the network-side device may determine, based on a feedback of the target terminal, the beam information used by the indication channel. Therefore, in a possible implementation, after the indicating the beam information of the indication channel by using a preset command, the beam indication method may further include: receiving third feedback information from the target terminal for the preset command; and if the third feedback information is acknowledgement information, sending the indication channel by using the beam information of the indication channel that is indicated by the preset command; or if the third feedback information is negative acknowledgement information, sending the indication channel by using current beam information of the indication channel.

In the foregoing possible implementation, the network side may not receive the third feedback information (possibly the target terminal has not received the preset command, or possibly the third feedback information fed back by the target terminal is lost during transmission), optionally, the method may further include: if the third feedback information is not received within a preset time, sending the indication channel by using the current beam information of the indication channel, or sending the indication channel by using the indicated beam information of the indication channel and the beam information currently used by the indication channel.

It can be learned from the foregoing embodiment that the beam indication method in this embodiment of this application can improve robustness and flexibility of the beam indication while reducing signaling overheads of beam indications of various channels and reference signals and accelerating a beam switching process.

It should be noted that the beam indication method provided in this embodiment of this application may be performed by a beam indication apparatus or a control module for performing the beam indication method in the beam indication apparatus. A beam indication apparatus provided in an embodiment of this application is described by assuming that the beam indication method in this embodiment of this application is performed by the beam indication apparatus.

Figure 3:
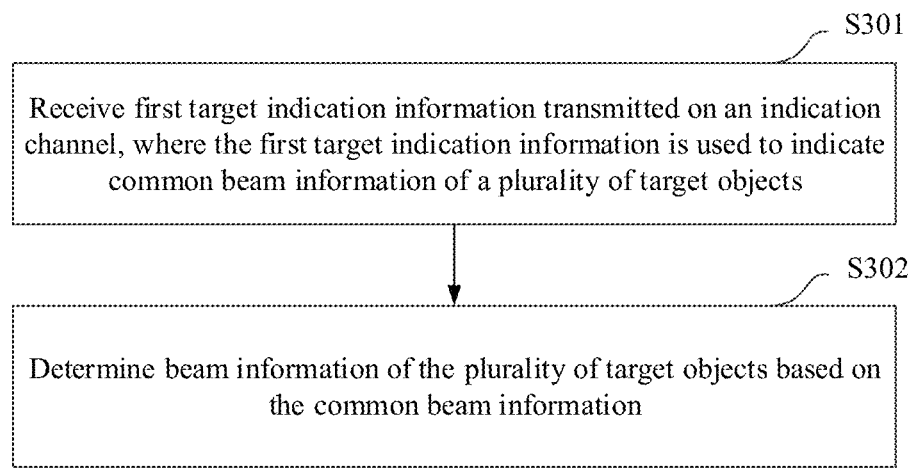
FIG. 3 is a schematic flowchart of a beam determining method according to an embodiment of this application.

FIG. 3 is a schematic flowchart of a beam determining method according to an embodiment of this application. The method may be performed by a terminal. In other words, the method 300 may be performed by software or hardware installed on the terminal. As shown in FIG. 3, the method may include the following steps.

S301. Receive first target indication information transmitted on an indication channel, where the first target indication information is used to indicate common beam information of a plurality of target objects, and the target object includes at least one of the following: a target channel and a target reference signal.

S302. Determine beam information of the plurality of target objects based on the common beam information.

In this embodiment of this application, the terminal receives the first target indication information transmitted on the indication channel, and then determines the beam information of the plurality of target objects based on the common beam information indicated by the first target indication information. Signaling overheads of beam indications of various channels and reference signals can be reduced.

It should be noted that the method 300 corresponds to the method 200. Specific details of the same content are similar to those of the method 200, and are not described again in this embodiment.

In a possible implementation, the indication channel may be a prescribed channel or a channel configured by a network.

In a possible implementation, the foregoing S301 may include: receiving DCI in a predetermined format, sent on the indication channel, where the DCI in the predetermined format includes a signaling field for indicating the common beam information; and obtaining the first target indication information from the signaling field.

The DCI in the predetermined format may include any one of the following: DCI carried on a physical downlink control channel PDCCH; DCI for scheduling data channel transmission; and DCI dedicated to indicating the common beam information.

The DCI in the predetermined format in this embodiment is the same as that in the method 200. For details, refer to the description in the method 200. Details are not described herein again.

In a possible implementation, the common beam information may include any one of the following: common transmission configuration indication TCI state information, common QCL information, and common spatial relation information.

In a possible implementation, the foregoing step S301 may perform the following content: receiving, on a preset CORESET, the first target indication information transmitted on the indication channel, or receiving, on a control resource set other than the preset control resource set, the first target indication information transmitted on the indication channel.

In a possible implementation, the indication channel may include a group common PDCCH or may include a dedicated PDCCH.

In a possible implementation, the indication channel may include a first group common PDCCH; and in this embodiment of this application, before step S301, the beam determining method may further include: receiving information of the first group common PDCCH that is configured by a network side, or receiving information of the first group common PDCCH that is indicated by a network side.

In the foregoing possible implementation, step S301 may perform the following content: monitoring the first group common PDCCH, and obtaining the first target indication information transmitted on the first group common PDCCH, where the first group common PDCCH is used to indicate first target indication information of at least one terminal, and the at least one terminal includes the terminal.

In a possible implementation, the monitoring the first group common PDCCH, and obtaining the first target indication information transmitted on the first group common PDCCH may include: monitoring the first group common PDCCH, where the first target indication information of the at least one terminal is transmitted on the first group common PDCCH, and the at least one terminal includes the terminal; and obtaining the first target indication information of the terminal based on a preset position or a preset order of first target indication information of each of the at least one terminal on the first group common PDCCH.

In a possible implementation, after step S301, the beam indication method may further include: if a status of the terminal changes, monitoring a second group common PDCCH, and obtaining the first target indication information transmitted on the second group common PDCCH, where the second group common PDCCH is a group common PDCCH other than the first group common PDCCH.

It may be understood that in a case that the status of the terminal changes, the terminal monitors a new group common PDCCH sent by a network-side device, that is, the second group common PDCCH, to obtain the first target indication information.

In a possible implementation, the monitoring the first group common PDCCH may include: if a status of the terminal changes, monitoring the first group common PDCCH based on first beam information, and obtaining the first target indication information transmitted on the first group common PDCCH, where the first beam information is different from second beam information, and the second beam information is beam information of the first group common PDCCH monitored before the status of the terminal changes.

It may be understood that in a case that the status of the terminal changes, the terminal may monitor the first group common PDCCH based on new beam information, that is, the first beam information, to obtain the first target indication information.

In a possible implementation, before the monitoring the first group common PDCCH, and obtaining the first target indication information transmitted on the first group common PDCCH, the beam indication method may further include: receiving first indication information, where the first indication information is used to indicate the preset position or the preset order of the first target indication information of the at least one terminal on the first group common PDCCH, and the at least one terminal includes the terminal.

It may be understood that the preset position or the preset order of the first target indication information of the at least one terminal on the first group common PDCCH is sent to each terminal by the network-side device by using the first indication information, and then each terminal may obtain the first target indication information by monitoring the first group common PDCCH.

In a possible implementation, the beam indication method may further include: receiving second indication information, where the second indication information is used to update the preset position or the preset order of the first target indication information of each of the at least one terminal on the first group common PDCCH or the second group common PDCCH. For example, when a status of a terminal in the at least one terminal changes, the network-side device may indicate or update a position or a carrying order of common beam information of each terminal on the first group common PDCCH or the second group common PDCCH.

In a possible implementation, the second group common PDCCH or the first beam information may be determined by using any one of the following:
  an uplink feedback resource currently used by the terminal;
  an uplink feedback resource used by the terminal to send feedback information of the indication channel;
  a beam report sent by the terminal;
  beam information used by the terminal to send an uplink channel; and
  a physical random access channel PRACH sent by the terminal.

In a possible implementation, after step S301, the beam indication method may further include: sending, on a first uplink feedback resource, first feedback information for the first target indication information, where if the first target indication information is successfully received, the first feedback information is acknowledgement information, or if the first target indication information is not successfully received, the first feedback information is negative acknowledgement information.

It may be understood that the terminal may feed back, on the uplink feedback resource indicated by the network-side device, the first feedback information for the first target indication information, and may determine, based on whether the first target indication information is successfully received, whether the feedback information is acknowledgement information or negative acknowledgement information.

In a possible implementation, after step S301, the beam indication method may further include: if the first target indication information is successfully received, transmitting the target object by using the common beam information indicated by the first target indication information, or transmitting the target object by using the common beam information indicated by the first target indication information and beam information currently used by the target object; or if the first target indication information is not successfully received, transmitting the target object based on beam information currently used by the target object.

In other words, if the terminal successfully receives the first target indication information, the terminal feeds back acknowledgement information to the network-side device, and may use the common beam information indicated by the first target indication information. In addition, because the first feedback information may be lost during transmission, the terminal may transmit the target object by using both the common beam information indicated by the first target indication information and the beam information currently used by the target object. Conversely, if the terminal does not successfully receive the first target indication information, the terminal feeds back negative acknowledgement information to the network-side device, and may transmit the target object by using the beam information currently used by the target object.

In a possible implementation, the beam indication method may further include: receiving third indication information, where the third indication information is used to indicate third beam information and/or fourth beam information, the third beam information is beam information of each CORESET in a first CORESET group, and the fourth beam information is beam information of each CORESET in a second CORESET group.

It may be understood that the network-side device may classify CORESETs into groups, and then separately indicate beam information of each group. Correspondingly, the terminal may receive the beam information of each CORESET in the first CORESET group, that is, the third beam information, or may receive beam information of each CORESET in the second CORESET group, that is, the fourth beam information. If the indication channel is transmitted on the first CORESET group and/or the second CORESET group, one of the third beam information and the fourth beam information may be beam information currently used by the indication channel, and the other is beam information of the indication channel that is indicated by the indication channel or beam information of the indication channel that is indicated by a preset command (for example, a MAC CE). For details, refer to the description in the foregoing step 200. Alternatively, if a control channel in the plurality of target objects is transmitted on the first CORESET group and/or the second CORESET group, one of the third beam information and the fourth beam information may be current beam information of the control channel, and the other is the common beam information indicated by the indication channel.

Correspondingly, if the indication channel is transmitted on the first CORESET group and/or the second CORESET group, in S301, the first target indication information transmitted on the indication channel may be received based on beam information corresponding to a CORESET on which the indication channel is located. Alternatively, if a target object is a control channel, and the control channel is transmitted on the first CORESET group and/or the second CORESET group, the target object may be transmitted based on beam information corresponding to a CORESET on which the target object is located, where the target object is the control channel.

The first CORESET group may include a CORESET with a smallest CORESET identifier, and the second CORESET group may include a CORESET other than the CORESET with the smallest CORESET identifier.

In a possible implementation, the receiving third indication information may include either of the following: receiving the third indication information from the indication channel; and receiving the third indication information sent by using a MAC CE command.

In a possible implementation, that the third indication information is used to indicate the third beam information and/or the fourth beam information may include either of the following: the third indication information includes a group identifier of the first CORESET group and the third beam information, and/or a group identifier of the second CORESET group and the fourth beam information; and the third beam information and/or the fourth beam information in the third indication information are/is arranged in a preset position or a preset order.

In the foregoing possible implementation, the terminal may further feed back feedback information for the third indication information, for example, feed back acknowledgement information for successful reception, or feed back negative acknowledgement information for unsuccessful reception.

In a possible implementation, the plurality of target objects may include the indication channel, or include channels and reference signals other than the indication channel.

In a possible implementation, when the plurality of target objects include channels and reference signals other than the indication channel, the beam indication method may further include: receiving second target indication information transmitted on the indication channel, where the second target indication information is used to indicate beam information of the indication channel. In other words, the indication channel can indicate not only the common beam information, but also its own beam information.

In a possible implementation, the receiving first target indication information and second target indication information transmitted on the indication channel may include any one of the following: obtaining the first target indication information from a first signaling field of the indication channel, and obtaining the second target indication information from a second signaling field of the indication channel; receiving, on the indication channel, the first target indication information transmitted by using a first indication channel format, and receiving, on the indication channel, the second target indication information transmitted by using a second indication channel format; or receiving the first target indication information on a preset first resource, and receiving the second target indication information on a preset second resource.

Alternatively, in another possible implementation, the first target indication information and the second target indication information may be transmitted by using only one resource or format. Therefore, in this possible implementation, the receiving first target indication information and second target indication information transmitted on the indication channel includes: receiving the indication channel transmitted in a predetermined format and/or the indication channel transmitted on a predetermined resource, and obtaining the first target indication information and the second target indication information, where the first target indication information is the same as the second target indication information.

In a possible implementation, after the receiving second target indication information transmitted on the indication channel, the beam indication method may further include: sending, on a second uplink feedback resource, second feedback information for the second target indication information, where if the second target indication information is successfully received, the second feedback information is acknowledgement information, or if the second target indication information is not successfully received, the second feedback information is negative acknowledgement information; and if the second target indication information is successfully received, receiving the indication channel by using the beam information indicated by the second target indication information, or receiving the indication channel by using the beam information indicated by the second target indication information and beam information currently used by the indication channel; or if the second target indication information is not successfully received, receiving the indication channel based on beam information currently used by the indication channel.

In a possible implementation, before step S301, the beam indication method may further include: receiving beam information of the indication channel that is indicated by a preset command.

The preset command may be a MAC CE command.

Correspondingly, after step S301, the beam indication method may further include: sending, on a third uplink feedback resource, third feedback information for the preset command, where if the preset command is successfully received, the third feedback information is acknowledgement information, or if the preset command is not successfully received, the third feedback information is negative acknowledgement information.

In the foregoing possible implementation, the beam indication method may further include: if the preset command is successfully received, receiving the indication channel by using the beam information indicated by the preset command, or receiving the indication channel by using the beam information indicated by the preset command and beam information currently used by the indication channel; or if the preset command is not successfully received, receiving the indication channel based on beam information currently used by the indication channel.

In a possible implementation, before the sending first feedback information, second feedback information, or third feedback information, the beam indication method may further include at least one of the following:

(1) receiving an uplink feedback resource configured or indicated by a network side, where the uplink feedback resource includes the first uplink feedback resource, the second uplink feedback resource, or the third uplink feedback resource; and (2) determining the first uplink feedback resource, the second uplink feedback resource, or the third uplink feedback resource based on preset resource information.

In other words, the terminal may feed back the first feedback information, the second feedback information, or the third feedback information on a same uplink feedback resource, or may feed back the first feedback information, the second feedback information, or the third feedback information on different uplink feedback resources.

The preset resource information may include any one of the following: a downlink resource used by the indication channel, an uplink feedback resource configured by a network, and a prescribed uplink feedback resource.

The downlink resource may include a case that the indication channel is a group common PDCCH or a dedicated PDCCH. For example, the terminal may send feedback information after N slots or sub-slots or symbols after the end of the group common PDCCH or the dedicated PDCCH, where N may be determined based on a specific application.

In a possible implementation, the determining the first uplink feedback resource, the second uplink feedback resource, or the third uplink feedback resource based on preset resource information may include at least one of the following:

(1) determining the first uplink feedback resource, the second uplink feedback resource, or the third uplink feedback resource based on the preset resource information in combination with identification information of the terminal, where for example, if the terminal sends the feedback information after the N slots or sub-slots or symbols after the end of the group common PDCCH or the dedicated PDCCH, a value of N corresponding to each piece of identification information may be prescribed, and the terminal determines corresponding N based on the identification information of the terminal and provides a feedback on a corresponding slot or sub-slot or symbol, so that different terminals can send feedback information on different uplink resources.

(2) determining the first uplink feedback resource, the second uplink feedback resource, or the third uplink feedback resource based on the preset resource information in combination with a radio network temporary identifier (Radio Network Temporary Identifier, RNTI) of the terminal;

(3) determining the first uplink feedback resource, the second uplink feedback resource, or the third uplink feedback resource based on the preset resource information and by using preset code information corresponding to the terminal;

(4) determining the first uplink feedback resource, the second uplink feedback resource, or the third uplink feedback resource based on the preset resource information and by using a preset time domain parameter corresponding to the terminal; and (5) determining the first uplink feedback resource, the second uplink feedback resource, or the third uplink feedback resource based on the preset resource information and by using a preset frequency domain parameter corresponding to the terminal.

In the foregoing possible implementation, the RNTI may be a cell radio network temporary identifier (C-RNTI).

It may be understood that the determining the first uplink feedback resource, the second uplink feedback resource, or the third uplink feedback resource may be determining uplink feedback resource information of each terminal based on the preset resource information in combination with a terminal ID or an RNTI (for example, a C-RNTI, cell-RNTI) that is used to uniquely identify the terminal; or may be selecting, by each terminal from uplink feedback resources configured by the network, uplink feedback resource information of the terminal by using a terminal ID or an RNTI (for example, a C-RNTI) that uniquely identifies the terminal; or may be determining uplink feedback resource information of each terminal based on the preset resource information and preset code information corresponding to each terminal, that is, each terminal uses the preset resource information in a code division mode; or may be determining uplink feedback resource information of each terminal based on the preset resource information and a preset time domain parameter (such as a time domain offset or a period) corresponding to each terminal, that is, each terminal uses the preset resource information in a time division mode; or may be determining uplink feedback resource information of each terminal based on the preset resource information and a preset frequency domain parameter (such as a frequency domain offset or a frequency hopping parameter) corresponding to each terminal, that is, each terminal uses the preset resource information in a frequency division mode.

Optionally, the preset resource information may be a periodic resource or an aperiodic resource, for example, a PUCCH resource, an aperiodic PUSCH resource, or a configured grant PUSCH resource.

Optionally, the first uplink feedback resource, the second uplink feedback resource, or the third uplink feedback resource may alternatively be a periodic resource or an aperiodic resource.

In each of the foregoing possible implementations, because the indication channel indicates switching of the beam information of the target object and/or the indication channel, or the preset command indicates the beam information of the indication channel, but the indication channel or the target object may be transmitted on a predetermined CORESET, beam information switching may occur on the predetermined CORESET. Therefore, the terminal needs to update a monitoring occasion of the predetermined CORESET. Therefore, in a possible implementation, the method may further include: if it is determined, based on the indication of the indication channel or based on a preset command, that beam switching occurs on a predetermined CORESET, determining a monitoring occasion of the predetermined CORESET based on either of the following:

(1) determining based on beam information of the predetermined CORESET after switching or based on a synchronization signal block SSB corresponding to the predetermined CORESET; and (2) determining based on predetermined configuration information from the network side, where the predetermined configuration information is sent by the network side by using the beam information of the predetermined CORESET after switching or beam information of the SSB corresponding to the predetermined CORESET.

In the foregoing possible implementation, the predetermined CORESET is a CORESET with a smallest CORESET identifier, such as the CORESET #0.

In the foregoing possible implementation, for the beam indication information of the CORESET #0, a transmission behavior of the CORESET #0 may be determined based on acknowledgement information or negative acknowledgement information fed back by the terminal. For details, refer to detailed descriptions in the foregoing possible implementations.

It can be learned from the foregoing embodiment that the beam determining method in this embodiment of this application can improve robustness and flexibility of the beam indication while reducing signaling overheads of beam indications of various channels and reference signals and accelerating a beam switching process.

It should be noted that the beam determining method provided in this embodiment of this application may be performed by a beam determining apparatus or a control module for performing the beam determining method in the beam determining apparatus. A beam determining apparatus provided in an embodiment of this application is described by assuming that the beam determining method in this embodiment of this application is performed by the beam determining apparatus.

Figure 4:
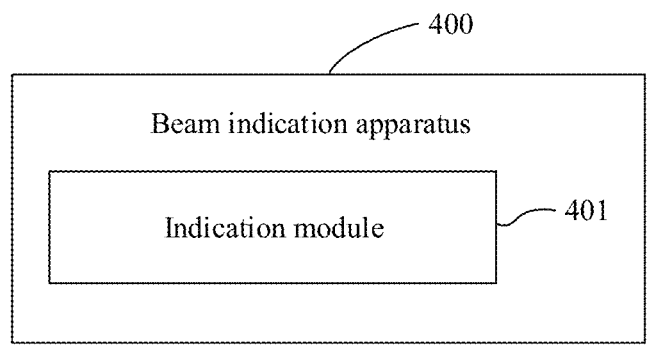
FIG. 4 is a schematic structural diagram of a beam indication apparatus according to an embodiment of this application.

FIG. 4 is a schematic structural diagram of a beam indication apparatus 400 according to an embodiment of this application. The beam indication apparatus 400 includes an indication module 401, configured to indicate common beam information of a plurality of target objects to a target terminal by using an indication channel, where the common beam information is used to indicate beam information of the plurality of target objects, and the target object includes at least one of the following: a target channel and a target reference signal.

In a possible implementation, the indication channel is a prescribed channel or a channel configured by a network.

In a possible implementation, that the indication module 401 indicates common beam information of a plurality of target objects to a target terminal by using an indication channel includes: sending, by using the indication channel, downlink control information DCI in a predetermined format to indicate the common beam information of the plurality of target objects, where the DCI in the predetermined format includes a signaling field for indicating the common beam information.

In a possible implementation, the DCI in the predetermined format includes any one of the following:

DCI carried on a physical downlink control channel PDCCH;

DCI for scheduling data channel transmission; and

DCI dedicated to indicating the common beam information.

In a possible implementation, the common beam information includes any one of the following: common transmission configuration indication TCI state information, common quasi-co-location QCL information, and common spatial relation information.

In a possible implementation, the indication channel is transmitted on a preset control resource set CORESET or transmitted on a control resource set other than the preset control resource set.

In a possible implementation, the indication channel includes a first group common PDCCH; and that the indication module 401 indicates common beam information of a plurality of target objects to a target terminal by using an indication channel includes: indicating common beam information of at least one terminal on the first group common PDCCH, where the at least one terminal includes the target terminal.

In a possible implementation, the apparatus may further include a configuration module, configured to configure information of the first group common PDCCH for the at least one terminal, or indicate information of the first group common PDCCH to the at least one terminal.

In a possible implementation, that the indication module 401 indicates common beam information of at least one terminal on the first group common PDCCH includes: adding common beam information of each of the at least one terminal to the first group common PDCCH based on a preset position or a preset order.

In a possible implementation, the apparatus further includes a first sending module, configured to send first indication information to the at least one terminal, where the first indication information indicates the predetermined position or the preset order of the common beam information of each of the at least one terminal on the first group common PDCCH.

In a possible implementation, after the information of the first group common PDCCH is configured for the at least one terminal, or the information of the first group common PDCCH is indicated to the at least one terminal, the indication module 401 is further configured to: if a status of a first terminal in the at least one terminal changes, indicate common beam information of the first terminal by using a second group common PDCCH, where the second group common PDCCH is a group common PDCCH other than the first group common PDCCH.

In a possible implementation, after the information of the first group common PDCCH is configured for the at least one terminal, or the information of the first group common PDCCH is indicated to the at least one terminal, the indication module 401 is further configured to: if a status of a first terminal in the at least one terminal changes, send the first group common PDCCH by using first beam information, and indicate common beam information of the first terminal by using the first group common PDCH, where the first beam information is different from second beam information, and the second beam information is beam information of the first group common PDCCH transmitted before the status of the first terminal changes.

In a possible implementation, the second group common PDCCH or the first beam information is determined by using any one of the following:

an uplink feedback resource currently used by the first terminal;

an uplink feedback resource used by the first terminal to send feedback information of the indication channel;

a beam report sent by the first terminal;

beam information used by the first terminal to send an uplink channel; and a physical random access channel PRACH sent by the first terminal.

In a possible implementation, the apparatus further includes a second sending module, configured to send second indication information to the at least one terminal if the status of the first terminal in the at least one terminal changes, where the second indication information is used to update a preset position or a preset order of common beam information of each of the at least one terminal on the first group common PDCCH or the second group common PDCCH.

In a possible implementation, the indication channel includes a dedicated PDCCH; and that the indication module 401 indicates common beam information of a plurality of target objects to a target terminal by using an indication channel includes: adding the common beam information to a common beam information signaling field in DCI on the dedicated PDCCH.

In a possible implementation, the apparatus may further include a receiving module, configured to receive first feedback information from the target terminal for the common beam information.

In a possible implementation, the apparatus may further include a transmission module, configured to: if the first feedback information is acknowledgement information, transmit the target object to the target terminal by using the common beam information; or if the first feedback information is negative acknowledgement information, transmit the target object to the target terminal based on beam information currently used by the target object.

In a possible implementation, the transmission module may be further configured to: if the first feedback information for the common beam information is not received from the target terminal within a preset time, transmit the target object to the target terminal based on beam information currently used by the target object, or transmit the target object to the target terminal by using the common beam information and beam information currently used by the target object.

In a possible implementation, the apparatus further includes an allocation module, configured to allocate a resource to the target terminal for sending the first feedback information, and receive the first feedback information on the resource.

In a possible implementation, the transmission module is further configured to transmit the target object to the target terminal by using the common beam information and beam information currently used by the target object.

In a possible implementation, the apparatus further includes a determining module, configured to determine third beam information as beam information of each CORESET in a first CORESET group, and determine fourth beam information as beam information of each CORESET in a second CORESET group.

In a possible implementation, if the indication channel is transmitted on the first CORESET group and/or the second CORESET group, one of the third beam information and the fourth beam information is beam information currently used by the indication channel, and the other is beam information of the indication channel that is indicated by the indication channel or a preset command; or if the target object is transmitted on the first CORESET group and/or the second CORESET group, one of the third beam information and the fourth beam information is beam information currently used by the target object, and the other is the common beam information indicated by the indication channel, where the target object is a control channel.

In a possible implementation, the first CORESET group includes a CORESET with a smallest CORESET identifier, and the second CORESET group includes a CORESET other than the CORESET with the smallest CORESET identifier.

In a possible implementation, the apparatus further includes a third sending module, configured to send third indication information to the target terminal, where the third indication information is used to indicate the third beam information and/or the fourth beam information.

In a possible implementation, that the third sending module sends third indication information to the target terminal includes either of the following: sending the third indication information by using the indication channel; and sending the third indication information by using a media access control MAC control element CE command.

In a possible implementation, that the third indication information is used to indicate the third beam information and/or the fourth beam information includes either of the following: the third indication information includes a group identifier of the first CORESET group and the third beam information, and/or a group identifier of the second CORESET group and the fourth beam information; and the third beam information and/or the fourth beam information in the third indication information are/is arranged in a preset position or a preset order.

In a possible implementation, the plurality of target objects include the indication channel.

In a possible implementation, the plurality of target objects include channels and reference signals other than the indication channel.

In a possible implementation, the indication channel is further used to indicate the beam information of the indication channel.

In a possible implementation, the indication channel includes a first signaling field and a second signaling field, where the first signaling field is used to indicate the common beam information of the plurality of target objects, and the second signaling field is used to indicate the beam information of the indication channel.

In a possible implementation, the indication channel indicates the common beam information and indicates the beam information of the indication channel in the following manner:

indicating the beam information of the indication channel by using a preset first indication channel format, and indicating the common beam information of the plurality of target objects by using a preset second indication channel format; or indicating the beam information of the indication channel by using a preset first resource, and indicating the common beam information of the plurality of target objects by using a preset second resource.

In a possible implementation, the indication channel indicates the common beam information and indicates the beam information of the indication channel in the following manner: indicating the common beam information and the beam information of the indication channel by using the indication channel in a predetermined format and/or transmitting the indication channel on a predetermined resource, where the common beam information is the same as the beam information of the indication channel.

In a possible implementation, the beam information of the indication channel is TCI state information of the CORESET on which the indication channel is located.

In a possible implementation, if the indication channel is the first group common PDCCH, in the beam information indicated by the first group common PDCCH, the beam information of the indication channel is different from the common beam information of the plurality of target objects.

In a possible implementation, the apparatus further includes a receiving module, configured to: receive second feedback information from the target terminal for the beam information of the indication channel; and if the second feedback information is acknowledgement information, transmit the indication channel to the target terminal by using the indicated beam information of the indication channel; or if the second feedback information is negative acknowledgement information, transmit the indication channel to the target terminal by using current beam information of the indication channel.

In a possible implementation, the receiving module is further configured to: if the second feedback information is not received within a preset time, transmit the indication channel to the target terminal by using the current beam information of the indication channel, or transmit the transmission channel to the target terminal by using the current beam information of the indication channel and the indicated beam information of the indication channel.

In a possible implementation, the transmission module is further configured to perform at least one of the following after the common beam information and the beam information of the indication channel are indicated by using the indication channel:

transmitting the target object to the target terminal by using the common beam information and the beam information currently used by the target object; and transmitting the indication channel to the target terminal by using the indicated beam information of the indication channel and the beam information currently used by the indication channel.

In a possible implementation, the indication module 401 may be further configured to indicate the beam information of the indication channel by using a preset command.

In a possible implementation, the transmission module is further configured to transmit the indication channel to the target terminal by using the indicated beam information of the indication channel and the beam information currently used by the indication channel.

In a possible implementation, the receiving module may be further configured to: receive third feedback information from the target terminal for the preset command; and if the third feedback information is acknowledgement information, send the indication channel by using the beam information of the indication channel that is indicated by the preset command; or if the third feedback information is negative acknowledgement information, send the indication channel by using current beam information of the indication channel.

In a possible implementation, the receiving module is further configured to: if the third feedback information is not received within a preset time, transmit the indication channel to the target terminal by using the current beam information of the indication channel, or transmit the transmission channel to the target terminal by using the current beam information of the indication channel and the beam information of the indication channel that is indicated by the preset command.

It can be learned from the foregoing embodiment that the network-side device in this embodiment of this application can improve robustness and flexibility of the beam indication while reducing signaling overheads of beam indications of various channels and reference signals and accelerating a beam switching process.

Figure 5:
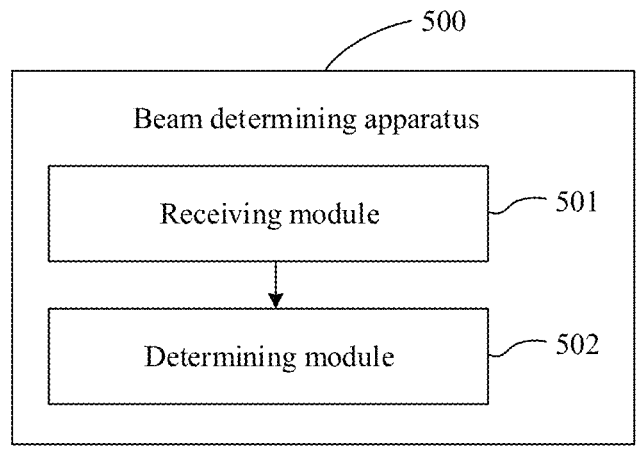
FIG. 5 is a schematic structural block diagram of a beam determining apparatus according to an embodiment of this application.

FIG. 5 is a schematic structural diagram of a beam determining apparatus 500 according to an embodiment of this application. As shown in FIG. 5, the beam determining apparatus 500 includes: a receiving module 501, configured to receive first target indication information transmitted on an indication channel, where the first target indication information is used to indicate common beam information of a plurality of target objects, and the target object includes at least one of the following: a target channel and a target reference signal; and a determining module 502, configured to determine beam information of the plurality of target objects based on the common beam information.

In a possible implementation, the indication channel is a prescribed channel or a channel configured by a network.

In a possible implementation, in the terminal 500 in this embodiment of this application, the receiving module 501 may be configured to:

receive downlink control information DCI in a predetermined format, sent on the indication channel, where the DCI in the predetermined format includes a signaling field for indicating the common beam information; and obtain the first target indication information from the signaling field.

In a possible implementation, the DCI in the predetermined format includes any one of the following:

DCI carried on a physical downlink control channel PDCCH;

DCI for scheduling data channel transmission; and

DCI dedicated to indicating the common beam information.

In a possible implementation, the common beam information includes any one of the following: common transmission configuration indication TCI state information, common quasi-co-location QCL information, and common spatial relation information.

In a possible implementation, the receiving module 501 may be further configured to:

receive, on a preset control resource set CORESET, the first target indication information transmitted on the indication channel, or receive, on a control resource set other than the preset control resource set, the first target indication information transmitted on the indication channel.

In a possible implementation, the indication channel includes a first group common PDCCH; and the receiving module 501 may be further configured to:

receive configuration information of the first group common PDCCH, or receive indication information of the first group common PDCCH.

In a possible implementation, the receiving first target indication information transmitted on an indication channel includes: monitoring the first group common PDCCH, and obtaining the first target indication information transmitted on the first group common PDCCH, where the first group common PDCCH is used to indicate first target indication information of at least one terminal, and the at least one terminal includes the terminal.

In a possible implementation, the receiving module 501 may be further configured to: monitor the first group common PDCCH, where the first target indication information of the at least one terminal is transmitted on the first group common PDCCH, and the at least one terminal includes the terminal; and obtain the first target indication information of the terminal based on a preset position or a preset order of first target indication information of each of the at least one terminal on the first group common PDCCH.

In a possible implementation, the receiving module 501 may be further configured to: if a status of the terminal changes, monitor a second group common PDCCH, and obtain the first target indication information transmitted on the second group common PDCCH, where the second group common PDCCH is a group common PDCCH other than the first group common PDCCH.

In a possible implementation, the monitoring the first group common PDCCH includes: if a status of the terminal changes, monitoring the first group common PDCCH based on first beam information, and obtaining the first target indication information transmitted on the first group common PDCCH, where the first beam information is different from second beam information, and the second beam information is beam information of the first group common PDCCH monitored before the status of the terminal changes.

In a possible implementation, the receiving module 501 may be further configured to receive first indication information, where the first indication information is used to indicate the preset position or the preset order of the first target indication information of the at least one terminal on the first group common PDCCH, and the at least one terminal includes the terminal.

In a possible implementation, the receiving module 501 may be further configured to receive second indication information, where the second indication information is used to update the preset position or the preset order of the first target indication information of each of the at least one terminal on the first group common PDCCH or the second group common PDCCH.

In a possible implementation, the second group common PDCCH or the first beam information is determined by using any one of the following:
an uplink feedback resource currently used by the terminal;
an uplink feedback resource used by the terminal to send feedback information of the indication channel;
a beam report sent by the terminal;
beam information used by the terminal to send an uplink channel; and
a physical random access channel PRACH sent by the terminal.

In a possible implementation, the indication channel is a PDCCH dedicated to the terminal.

In a possible implementation, the apparatus may further include a first sending module, configured to send, on a first uplink feedback resource, first feedback information for the first target indication information, where if the first target indication information is successfully received, the first feedback information is acknowledgement information, or if the first target indication information is not successfully received, the first feedback information is negative acknowledgement information.

In a possible implementation, the apparatus may further include a first transmission module, configured to: if the first target indication information is successfully received, transmit the target object by using the common beam information indicated by the first target indication information, or transmit the target object by using the common beam information and beam information currently used by the target object; or if the first target indication information is not successfully received, transmit the target object based on beam information currently used by the target object.

In a possible implementation, the receiving module 501 may be further configured to receive third indication information, where the third indication information is used to indicate third beam information and/or fourth beam information, the third beam information is beam information of each CORESET in a first CORESET group, and the fourth beam information is beam information of each CORESET in a second CORESET group.

In a possible implementation, the receiving module 501 is further configured to receive, based on beam information corresponding to a CORESET on which the indication channel is located, the first target indication information transmitted on the indication channel; or the receiving module 501 is further configured to transmit the target object based on beam information corresponding to a CORESET on which the target object is located, where the target object is a control channel.

In a possible implementation, the first CORESET group includes a CORESET with a smallest CORESET identifier, and the second CORESET group includes a CORESET other than the CORESET with the smallest CORESET identifier.

In a possible implementation, the receiving third indication information includes either of the following:
receiving the third indication information from the indication channel; and receiving the third indication information sent by using a MAC CE command.

In a possible implementation, that the third indication information is used to indicate the third beam information and/or the fourth beam information includes either of the following:
the third indication information includes a group identifier of the first CORESET group and the third beam information, and/or a group identifier of the second CORESET group and the fourth beam information; and
the third beam information and/or the fourth beam information in the third indication information are/is arranged in a preset position or a preset order.

In a possible implementation, the plurality of target objects include the indication channel.

In a possible implementation, the plurality of target objects include channels and reference signals other than the indication channel.

In a possible implementation, the receiving module 501 may be further configured to receive second target indication information transmitted on the indication channel, where the second target indication information is used to indicate beam information of the indication channel.

In a possible implementation, the receiving first target indication information and second target indication information transmitted on the indication channel includes: obtaining the first target indication information from a first signaling field of the indication channel, and obtaining the second target indication information from a second signaling field of the indication channel.

In a possible implementation, the receiving module 501 may be further configured to: receive, on the indication channel, the first target indication information transmitted by using a first indication channel format, and receive, on the indication channel, the second target indication information transmitted by using a second indication channel format; or receive the first target indication information on a preset first resource, and receive the second target indication information on a preset second resource.

In a possible implementation, the receiving module 501 may be further configured to receive the indication channel transmitted in a predetermined format and/or the indication channel transmitted on a predetermined resource, and obtain the first target indication information and the second target indication information, where the first target indication information is the same as the second target indication information.

In a possible implementation, the apparatus may further include a second sending module, configured to send, on a second uplink feedback resource, second feedback information for the second target indication information, where if the second target indication information is successfully received, the second feedback information is acknowledgement information, or if the second target indication information is not successfully received, the second feedback information is negative acknowledgement information.

In a possible implementation, the apparatus may further include a second transmission module, configured to: if the second target indication information is successfully received, receive the indication channel by using the beam information indicated by the second target indication information, or receive the indication channel by using the beam information indicated by the second target indication information and beam information currently used by the indication channel; or if the second target indication information is not successfully received, receive the indication channel based on beam information currently used by the indication channel.

In a possible implementation, the receiving module 501 may be further configured to receive beam information of the indication channel that is indicated by a preset command.

In a possible implementation, the apparatus may further include a third sending module, configured to: send, on a third uplink feedback resource, third feedback information for the preset command, where if the preset command is successfully received, the third feedback information is acknowledgement information, or if the preset command is not successfully received, the third feedback information is negative acknowledgement information.

In a possible implementation, the receiving module 501 may be further configured to: if the preset command is successfully received, receive the indication channel by using the beam information indicated by the preset command, or receive the indication channel by using the beam information indicated by the preset command and beam information currently used by the indication channel; or if the preset command is not successfully received, receive the indication channel based on beam information currently used by the indication channel.

In a possible implementation, the receiving module 501 may further perform at least one of the following:

receiving an uplink feedback resource configured or indicated by a network side, where the uplink feedback resource includes the first uplink feedback resource, the second uplink feedback resource, or the third uplink feedback resource; and determining the first uplink feedback resource, the second uplink feedback resource, or the third uplink feedback resource based on preset resource information.

In a possible implementation, the preset resource information includes any one of the following: a downlink resource used by the indication channel, an uplink feedback resource configured by a network, and a prescribed uplink feedback resource.

In a possible implementation, the apparatus may further include a determining module, configured to perform at least one of the following:

determining the first uplink feedback resource, the second uplink feedback resource, or the third uplink feedback resource based on the preset resource information in combination with identification information of the terminal;

determining the first uplink feedback resource, the second uplink feedback resource, or the third uplink feedback resource based on the preset resource information in combination with a radio network temporary identifier RNTI of the terminal;

determining the first uplink feedback resource, the second uplink feedback resource, or the third uplink feedback resource based on the preset resource information and by using preset code information corresponding to the terminal;

determining the first uplink feedback resource, the second uplink feedback resource, or the third uplink feedback resource based on the preset resource information and by using a preset time domain parameter corresponding to the terminal; and determining the first uplink feedback resource, the second uplink feedback resource, or the third uplink feedback resource based on the preset resource information and by using a preset frequency domain parameter corresponding to the terminal.

In a possible implementation, the RNTI is a cell radio network temporary identifier (C-RNTI).

In a possible implementation, the preset resource information is a periodic resource or an aperiodic resource.

In a possible implementation, the apparatus further includes a determining module, configured to: if it is determined, based on the indication of the indication channel or based on a preset command, that beam switching occurs on a predetermined CORESET, determine a monitoring occasion of the predetermined CORESET based on either of the following: determining based on beam information of the predetermined CORESET after switching or based on a synchronization signal block SSB corresponding to the predetermined CORESET; and determining based on predetermined configuration information from the network side, where the predetermined configuration information is sent by the network side by using the beam information of the predetermined CORESET after switching or beam information of the SSB corresponding to the predetermined CORESET, where the predetermined CORESET is a CORESET with a smallest CORESET identifier.

It can be learned from the foregoing embodiment that the beam determining apparatus in this embodiment of this application can improve robustness and flexibility of the beam indication while reducing signaling overheads of beam indications of various channels and reference signals and accelerating a beam switching process.

Figure 6:
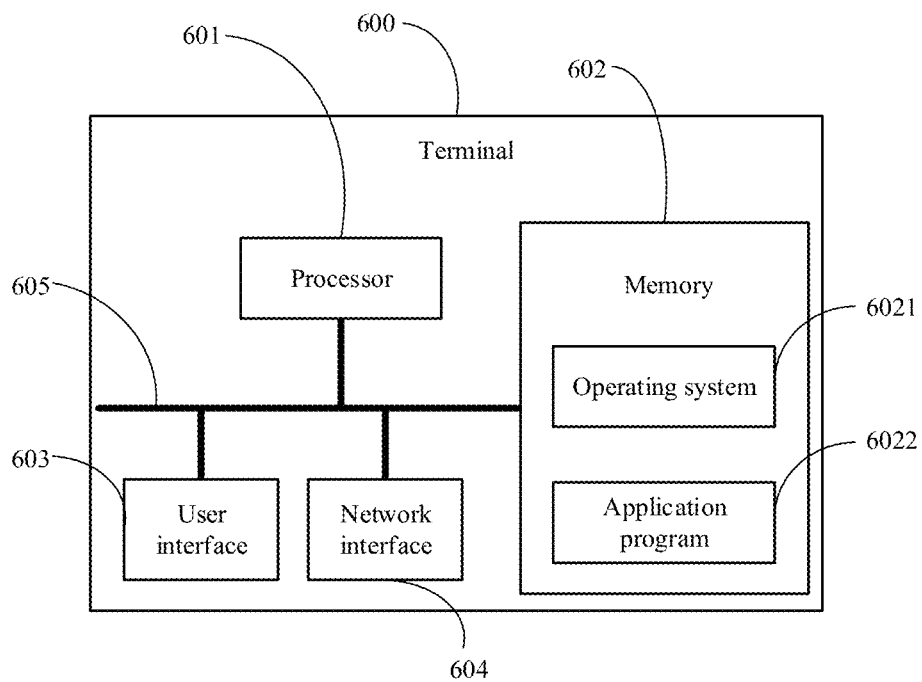
FIG. 6 is a structural block diagram of a terminal according to an embodiment of this application.

FIG. 6 is a structural block diagram of a terminal according to an embodiment of this application. The terminal 600 shown in FIG. 6 includes at least one processor 601, a memory 602, at least one network interface 604, and a user interface 603. The components of the terminal 600 are coupled together by using a bus system 605. It can be understood that the bus system 605 is configured to implement connection and communication between these components. In addition to a data bus, the bus system 605 further includes a power bus, a control bus, and a status signal bus. However, for clarity of description, various buses are marked as the bus system 605 in FIG. 6.

The user interface 603 may include a display, a keyboard, a pointing device (for example, a mouse or a trackball (trackball)), a touch panel or a touchscreen, or the like.

It can be understood that the memory 602 in this embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. As exemplary rather than restrictive description, many forms of RAM can be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus random access memory (DRRAM). The memory 602 of the system and the method described in the embodiments of this application is intended to include without being limited to these and any other applicable types of memories.

In some implementations, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player (Media Player), and a browser (Browser), and is configured to implement various application services. A program for implementing the method in the embodiments of this application may be included in the application program 6022.

In this embodiment of this application, the terminal 600 further includes a program or instructions stored in the memory 602 and capable of running on the processor 601. When the program or instructions are executed by the processor 601, the following steps are implemented:

receiving first target indication information transmitted on an indication channel, where the first target indication information is used to indicate common beam information of a plurality of target objects, and the target object includes at least one of the following: a target channel and a target reference signal; and determining beam information of the plurality of target objects based on the common beam information.

The method disclosed in the foregoing embodiments of this application may be applied to the processor 601 or implemented by the processor 601. The processor 601 may be an integrated circuit chip that has a signal processing capability. During implementation, the steps of the foregoing method may be completed by hardware integrated logic circuits in the processor 601 or instructions in the form of software. The processor 601 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and a software module in a decoding processor. The software module may be located in a computer readable storage medium that is mature in the art, such as a random access memory, a flash memory, a read-only memory, a programmable read-only memory or electrically erasable programmable memory, or a register. The computer-readable storage medium is located in the memory 602, and the processor 601 reads information in the memory 602, and completes the steps of the foregoing method in combination with its hardware. Alternatively, a computer program is stored in the computer-readable storage medium, and when the computer program is executed by the processor 601, the steps of the foregoing method embodiment are implemented.

It may be understood that the embodiments described in the embodiments of this application may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, and other electronic units for performing the functions described in this application, or a combination thereof.

For software implementation, the technologies described in the embodiments of this application may be implemented by modules (for example, processes or functions) that perform the functions described in the embodiments of this application. Software code may be stored in the memory and executed by the processor. The memory may be implemented in or outside the processor.

The terminal 600 can implement each process implemented by the terminal in the foregoing embodiment. To avoid repetition, details are not described herein again.

Figure 7:
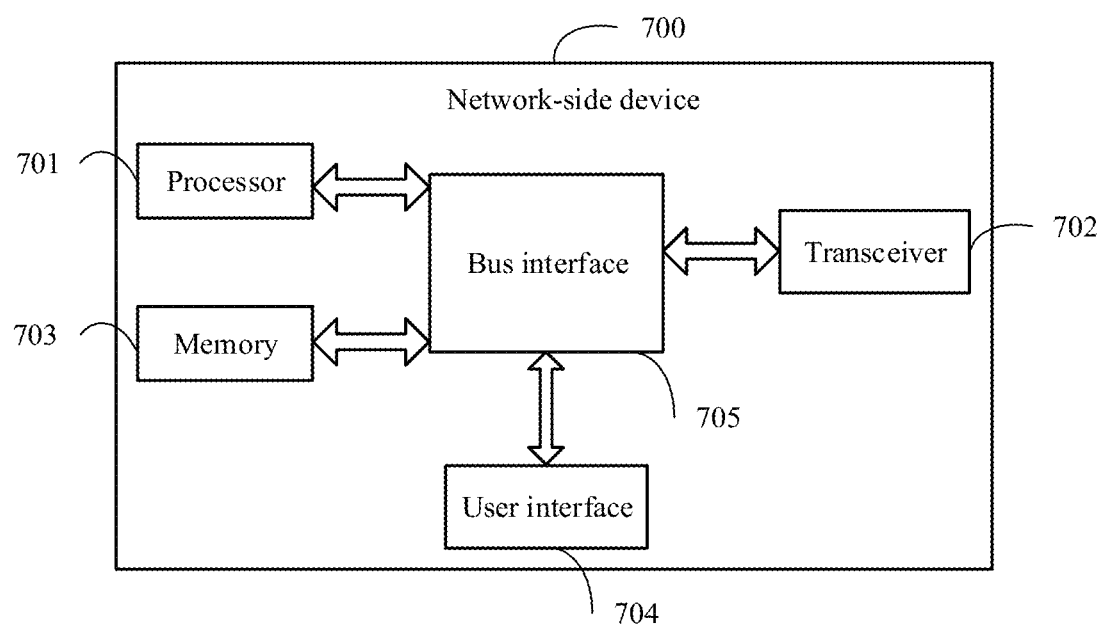
FIG. 7 is a structural block diagram of a network-side device according to an embodiment of this application.

FIG. 7 is a structural block diagram of a network-side device according to an embodiment of this application. The network-side device is capable of implementing details of the foregoing methods 200, with the same effects achieved. As shown in FIG. 7, the network-side device 700 includes a processor 701, a transceiver 702, a memory 703, a user interface 704, and a bus interface 705.

In this embodiment of this application, the network-side device 700 further includes a program or instructions stored in the memory 703 and capable of running on the processor 701. When the program or instructions are executed by the processor 701, the following step is implemented:

indicating common beam information of a plurality of target objects to a target terminal by using an indication channel, where the common beam information is used to indicate beam information of the plurality of target objects, and the target object includes at least one of the following: a target channel and a target reference signal.

In FIG. 7, a bus architecture may include any quantity of interconnect buses and bridges, and connects together circuits that are of one or more processors represented by the processor 701 and of a memory represented by the memory 703. The bus architecture may further interconnect various other circuits such as a peripheral device, a voltage regulator, and a power management circuit. These are all well known in the art, and therefore are not further described in this specification. The bus interface 705 provides an interface. The transceiver 702 may be a plurality of components, including a transmitter and a receiver, and provides units for communicating with a variety of other apparatuses on a transmission medium. For different user equipments, the user interface 704 may also be an interface that can be externally or internally connected to a required device. The connected device includes but is not limited to a keypad, a display, a speaker, a microphone, a joystick, and the like.

The processor 701 is responsible for management of the bus architecture and general processing, and the memory 703 is capable of storing data that is used by the processor 701 during operation.

Preferably, an embodiment of this application further provides a network-side device, including a memory, a processor, and a program or instructions stored in the memory and capable of running on the processor. When the program or instructions are executed by the processor, each process of the foregoing embodiment of the beam indication method is implemented, with the same technical effect achieved. To avoid repetition, details are not described herein again.

Preferably, an embodiment of this application further provides a terminal, including a processor, a memory, and a program or instructions stored in the memory and capable of running on the processor. When the program or instructions are executed by the processor, each process of the foregoing embodiment of the beam determining method is implemented, with the same technical effect achieved. To avoid repetition, details are not described herein again.

An embodiment of this application further provides a readable storage medium. The readable storage medium stores a program or instructions. When the program or instructions are executed by a processor, each process of the foregoing method embodiment of the beam determining method applied to the terminal is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

Preferably, an embodiment of this application further provides a network-side device, including a processor, a memory, and a program or instructions stored in the memory and capable of running on the processor. When the program or instructions are executed by the processor, each process of the foregoing embodiment of the beam indication method is implemented, with the same technical effect achieved. To avoid repetition, details are not described herein again.

An embodiment of this application further provides a readable storage medium. The readable storage medium stores a program or instructions. When the program or instructions are executed by a processor, each process of the embodiment of the foregoing beam indication method applied to the network-side device is implemented, with the same technical effect achieved. To avoid repetition, details are not described herein again.

The processor is a processor in the network-side device in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions on a network-side device to implement each process of the foregoing embodiments of the beam indication method and the beam determining method, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

What is claimed is:

1. A beam determining method, comprising:
receiving, by a terminal, first target indication information transmitted on an indication channel, wherein the first target indication information is used to indicate common beam information of a plurality of target objects, and the target object comprises at least one of the following: a target channel and a target reference signal; and
determining, by the terminal, beam information of the plurality of target objects based on the common beam information,
wherein the indication channel comprises a first group common PDCCH,
the receiving the first target indication information transmitted on the indication channel comprises:
monitoring the first group common PDCCH, and obtaining the first target indication information transmitted on the first group common PDCCH, wherein the first group common PDCCH is used to indicate first target indication information of at least one terminal, and the at least one terminal comprises the terminal,
wherein the monitoring the first group common PDCCH, and obtaining the first target indication information transmitted on the first group common PDCCH comprises:
monitoring the first group common PDCCH, wherein the first target indication information of the at least one terminal is transmitted on the first group common PDCCH, and the at least one terminal comprises the terminal; and
obtaining the first target indication information of the terminal based on a preset position or a preset order of first target indication information of each of the at least one terminal on the first group common PDCCH.

2. The method according to claim 1, wherein the indication channel is a prescribed channel or a channel configured by a network.

3. The method according to claim 1, wherein the receiving, by a terminal, first target indication information transmitted on an indication channel comprises:
receiving, by the terminal, downlink control information (DCI) in a predetermined format, sent on the indication channel, wherein the DCI in the predetermined format comprises a signaling field for indicating the common beam information; and
obtaining, by the terminal, the first target indication information from the signaling field.

4. The method according to claim 3, wherein the DCI in the predetermined format comprises any one of the following:
DCI carried on a physical downlink control channel (PDCCH);
DCI for scheduling data channel transmission; and
DCI dedicated to indicating the common beam information.

5. The method according to claim 1, wherein the common beam information comprises any one of the following: common transmission configuration indication TCI state information, common quasi-co-location (QCL) information, and common spatial relation information.

6. The method according to claim 1, wherein the indication channel is a PDCCH dedicated to the terminal.

7. The method according to claim 1, wherein after the receiving, by a terminal, first target indication information transmitted on an indication channel, the method further comprises:
sending, by the terminal on a first uplink feedback resource, first feedback information for the first target indication information, wherein in a case that the first target indication information is successfully received, the first feedback information is acknowledgement information, or in a case that the first target indication information is not successfully received, the first feedback information is negative acknowledgement information.

8. The method according to claim 7, wherein after the receiving, by a terminal, first target indication information transmitted on an indication channel, the method further comprises:
in a case that the first target indication information is successfully received, transmitting, by the terminal, the target object by using the common beam information indicated by the first target indication information, or transmitting, by the terminal, the target object by using the common beam information and beam information currently used by the target object; or
in a case that the first target indication information is not successfully received, transmitting, by the terminal, the target object based on beam information currently used by the target object.

9. The method according to claim 1, wherein the method further comprises: receiving, by the terminal, third indication information, wherein the third indication information is used to indicate third beam information and/or fourth beam information, the third beam information is beam information of each control resource set (CORESET) in a first CORESET group, and the fourth beam information is beam information of each CORESET in a second CORESET group.

10. The method according to claim 9, wherein the receiving, by the terminal, third indication information comprises either of the following:
receiving, by the terminal, the third indication information from the indication channel; and
receiving, by the terminal, the third indication information sent by using a media access control control element (MAC CE) command.

11. A network-side device, comprising:
a processor, and
a memory storing a program or instructions that is capable of running on the processor, wherein the program or instructions, when executed by the processor, causes the network-side device to perform the following steps:
indicating common beam information of a plurality of target objects to a target terminal by using an indication channel, wherein the common beam information is used to indicate beam information of the plurality of target objects, and the target object comprises at least one of the following: a target channel or a target reference signal,
wherein the indication channel comprises a first group common PDCCH,
the indicating the common beam information of the plurality of target objects to the target terminal by using the indication channel comprises:
indicating common beam information of at least one terminal on the first group common PDCCH, wherein the at least one terminal comprises the target terminal,
wherein the indicating the common beam information of at least one terminal on the first group common PDCCH comprises:
carrying common beam information of each of the at least one terminal to the first group common PDCCH based on a preset position or a preset order.

12. The network-side device according to claim 11, wherein the indication channel is a prescribed channel or a channel configured by a network.

13. The network-side device according to claim 11, wherein the indicating common beam information of a plurality of target objects to a target terminal by using an indication channel comprises: sending by using the indication channel, downlink control information (DCI) in a predetermined format to indicate the common beam information of the plurality of target objects, wherein the DCI in the predetermined format comprises a signaling field for indicating the common beam information.

14. The network-side device according to claim 13, wherein the DCI in the predetermined format comprises any one of the following:
DCI carried on a physical downlink control channel (PDCCH);
DCI for scheduling data channel transmission; or
DCI dedicated to indicating the common beam information.

15. The network-side device according to claim 11, wherein the common beam information comprises any one of the following: common transmission configuration indication (TCI) state information, common quasi-co-location (QCL) information, or common spatial relation information.

16. The network-side device according to claim 11, wherein the indication channel comprises a dedicated PDCCH; and
the indicating common beam information of a plurality of target objects to a target terminal by using an indication channel comprises:
adding the common beam information to a common beam information signaling field in DCI on the dedicated PDCCH.

17. The network-side device according to claim 11, wherein after the indicating common beam information of a plurality of target objects to a target terminal by using an indication channel, the program or instructions, when executed by the processor, causes the network-side device to further perform the following steps:
- receiving first feedback information from the target terminal for the common beam information.

18. The network-side device according to claim 17, wherein after the receiving first feedback information from the target terminal for the indication channel, the program or instructions, when executed by the processor, causes the network-side device to further perform the following steps:
- in a case that the first feedback information is acknowledgement information, transmitting the target object to the target terminal based on the common beam information; or
- in a case that the first feedback information is negative acknowledgement information, transmitting the target object to the target terminal based on beam information currently used by the target object.

19. The network-side device according to claim 11, wherein the program or instructions, when executed by the processor, causes the network-side device to further perform the following steps:
- determining third beam information as beam information of each CORESET in a first CORESET group, and determining fourth beam information as beam information of each CORESET in a second CORESET group.

20. A terminal, comprising:
- a processor; and
- a memory storing a program or instructions that is capable of running on the processor, wherein the program or instructions, when executed by the processor, causes the terminal to perform the following steps:
- receiving first target indication information transmitted on an indication channel, wherein the first target indication information is used to indicate common beam information of a plurality of target objects, and the target object comprises at least one of the following: a target channel and a target reference signal; and
- determining beam information of the plurality of target objects based on the common beam information,
- wherein the indication channel comprises a first group common PDCCH,
- the receiving the first target indication information transmitted on the indication channel comprises:
- monitoring the first group common PDCCH, and obtaining the first target indication information transmitted on the first group common PDCCH, wherein the first group common PDCCH is used to indicate first target indication information of at least one terminal, and the at least one terminal comprises the terminal,
- wherein the monitoring the first group common PDCCH, and obtaining the first target indication information transmitted on the first group common PDCCH comprises:
- monitoring the first group common PDCCH, wherein the first target indication information of the at least one terminal is transmitted on the first group common PDCCH, and the at least one terminal comprises the terminal; and
- obtaining the first target indication information of the terminal based on a preset position or a preset order of first target indication information of each of the at least one terminal on the first group common PDCCH.

* * * * *